(12) United States Patent
Hayashi et al.

(10) Patent No.: US 10,638,034 B2
(45) Date of Patent: Apr. 28, 2020

(54) IMAGING CONTROL APPARATUS, IMAGING CONTROL METHOD, CAMERA SYSTEM, AND PROGRAM

(71) Applicant: FUJIFILM Corporation, Tokyo (JP)

(72) Inventors: Daisuke Hayashi, Saitama (JP); Mikio Watanabe, Saitama (JP); Takeshi Misawa, Saitama (JP); Masaya Tamaru, Saitama (JP); Fuminori Irie, Saitama (JP); Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 465 days.

(21) Appl. No.: 15/446,840

(22) Filed: Mar. 1, 2017

(65) Prior Publication Data

US 2017/0180635 A1    Jun. 22, 2017

Related U.S. Application Data

(63) Continuation of application No. PCT/JP2015/068040, filed on Jun. 23, 2015.

(30) Foreign Application Priority Data

Sep. 8, 2014    (JP) .................. 2014-182531

(51) Int. Cl.
*H04N 5/232*    (2006.01)
*H04N 7/18*    (2006.01)
(Continued)

(52) U.S. Cl.
CPC ......... *H04N 5/23216* (2013.01); *G03B 17/02* (2013.01); *G03B 17/561* (2013.01);
(Continued)

(58) Field of Classification Search
CPC ........... H04N 5/23216; H04N 5/23203; H04N 5/23238; H04N 5/23293; G03B 17/02; G03B 17/561
(Continued)

(56) References Cited

U.S. PATENT DOCUMENTS

| 5,764,276 A | 6/1998 | Martin et al. | |
| 2001/0040636 A1* | 11/2001 | Kato | H04N 5/232 |
| | | | 348/333.03 |

FOREIGN PATENT DOCUMENTS

| JP | 8-214206 A | 8/1996 |
| JP | 9-102902 A | 4/1997 |

(Continued)

OTHER PUBLICATIONS

International Search Report (PCT/ISA/210), issued in PCT/JP2015/068040, dated Sep. 1, 2015.
(Continued)

*Primary Examiner* — Patricia I Young
*Assistant Examiner* — Kristin Dobbs
(74) *Attorney, Agent, or Firm* — Birch, Stewart, Kolasch & Birch, LLP

(57) ABSTRACT

An imaging control device according to an aspect of the present invention includes a rotation instruction input unit that receives an input of an instruction of rotation of a pan and tilt mechanism of a camera, a rotation instruction output unit that outputs the rotation instruction to the camera, an image input unit that receives a live view image according to the rotation instruction from the camera, and a display control unit that causes the display unit to perform a display for superimposing the live view image input from the camera on a limit display image of a two-dimensionally displayed spherical surface indicating an imagable region and a non-imagable region respectively corresponding to
(Continued)

within a rotation limit and out of the rotation limit of the imaging unit of the camera, and rotating the limit display image along the two-dimensionally displayed spherical surface according to the input of the rotation instruction.

11 Claims, 17 Drawing Sheets

(51) Int. Cl.
*G03B 17/56* (2006.01)
*G03B 17/02* (2006.01)
(52) U.S. Cl.
CPC ..... *H04N 5/23203* (2013.01); *H04N 5/23238* (2013.01); *H04N 5/23293* (2013.01); *H04N 5/23296* (2013.01); *H04N 7/183* (2013.01)
(58) Field of Classification Search
USPC .......................................... 348/39
See application file for complete search history.

(56) References Cited

FOREIGN PATENT DOCUMENTS

| JP | 9-154055 A | 6/1997 |
| JP | 9-186911 A | 7/1997 |
| JP | 2002-509662 A | 3/2002 |
| JP | 2006-245793 A | 9/2006 |
| JP | 2010-49346 A | 3/2010 |
| JP | 2010049346 A * | 3/2010 |

OTHER PUBLICATIONS

Written Opinion of the International Searching Authority (PCT/ISA/237), issued in PCT/JP2015/068040, dated Sep. 1, 2015.

* cited by examiner

FIG. 1
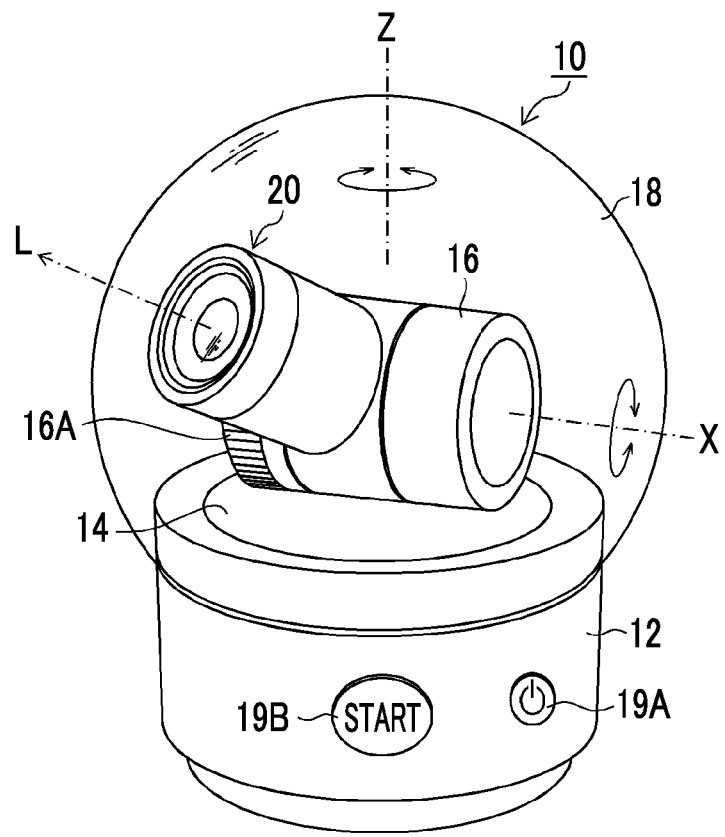
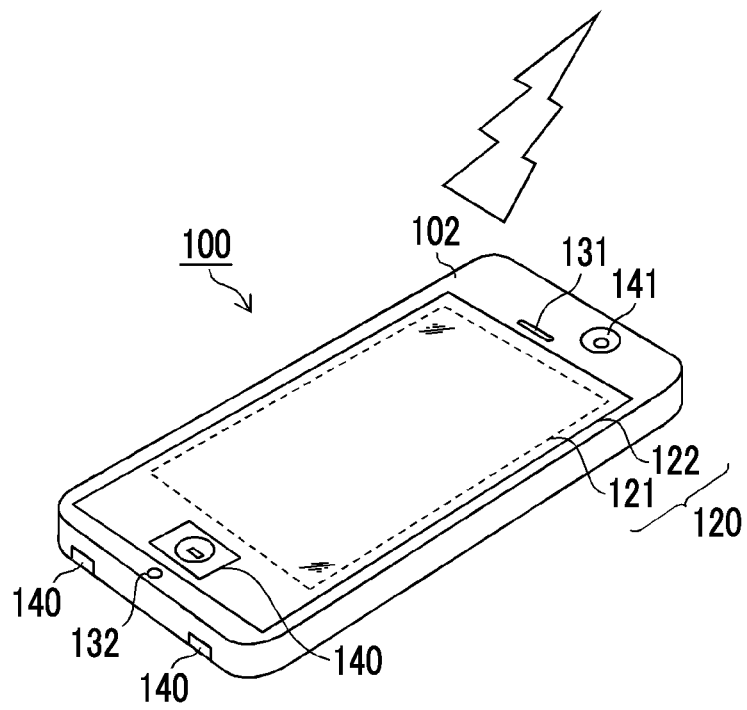

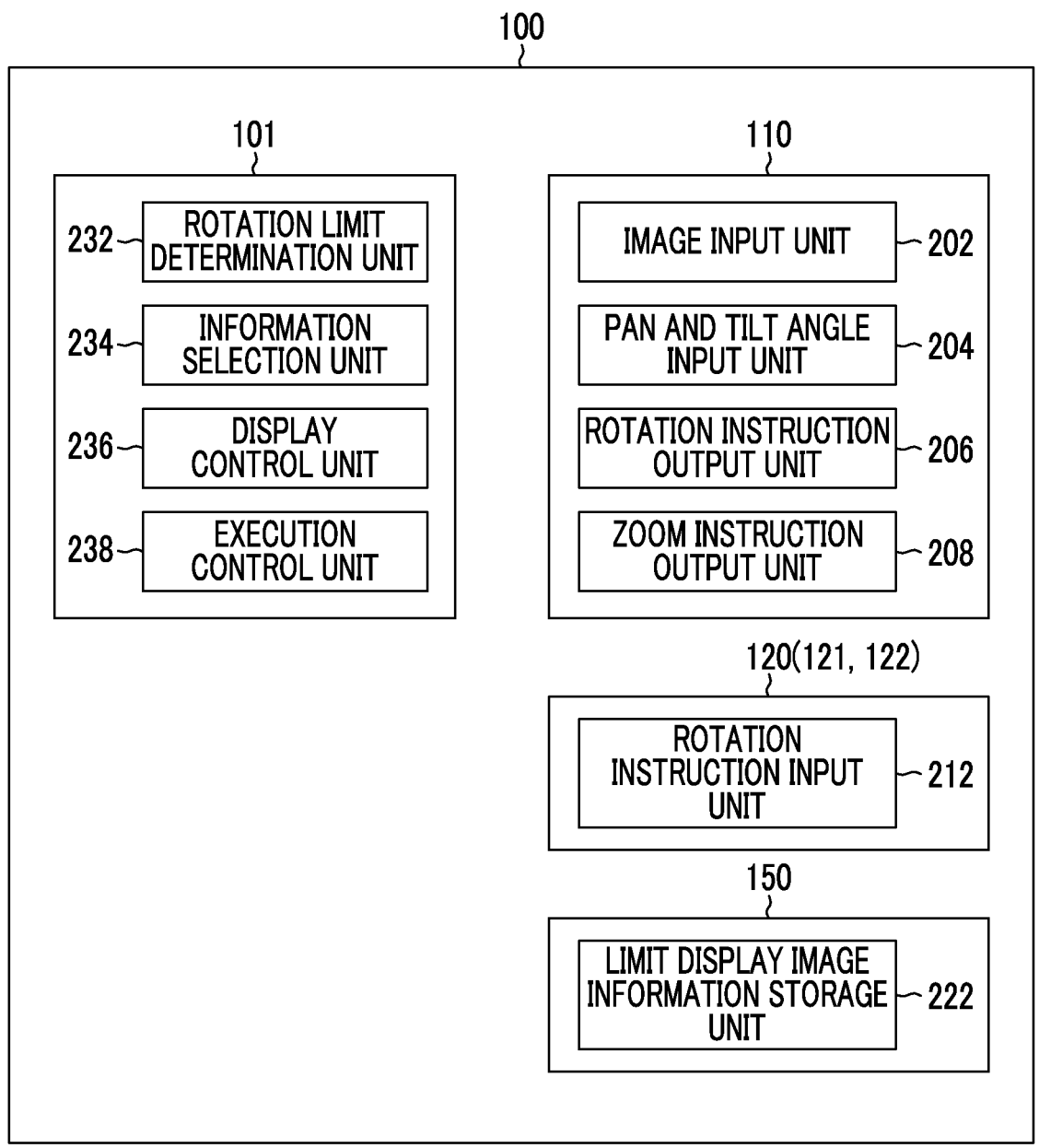

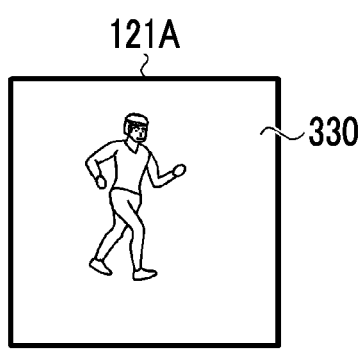 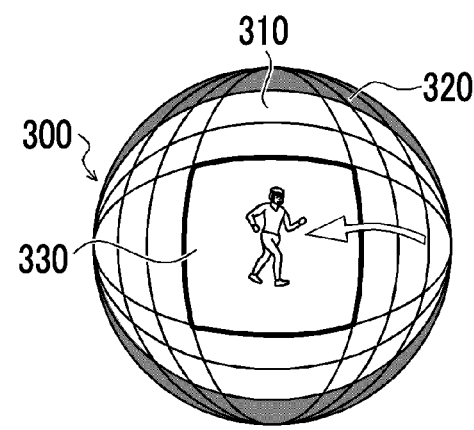
FIG. 11A
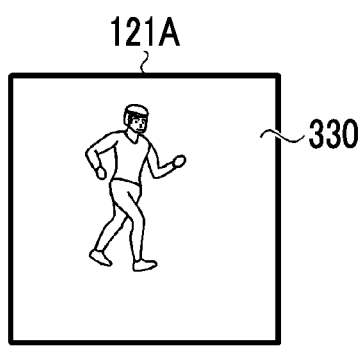 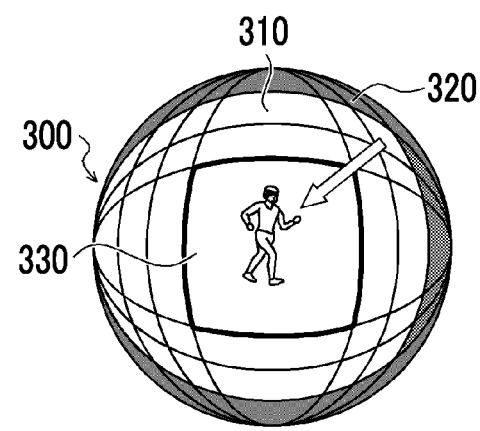
FIG. 11B
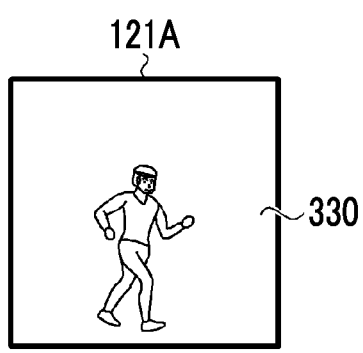 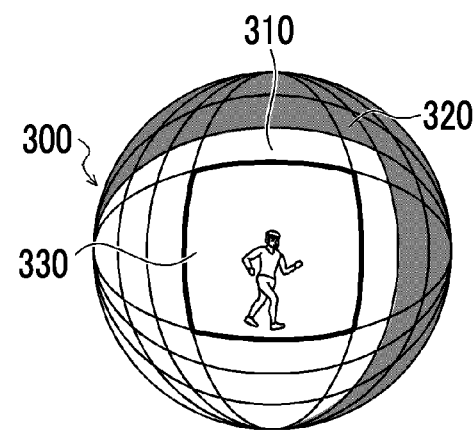
FIG. 11C FIG. 15A 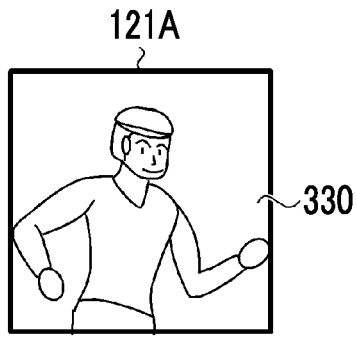 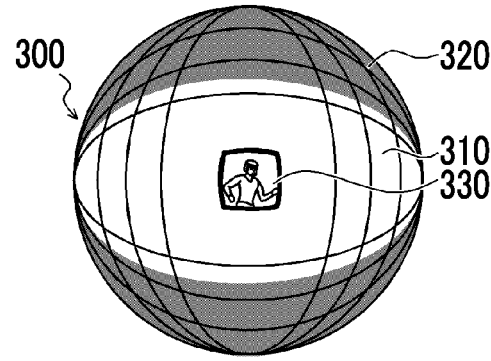
FIG. 15B 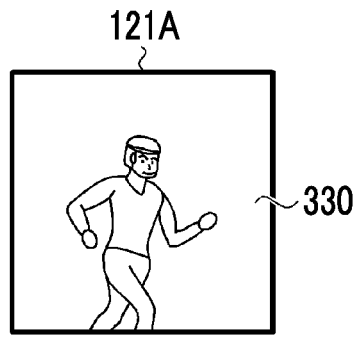 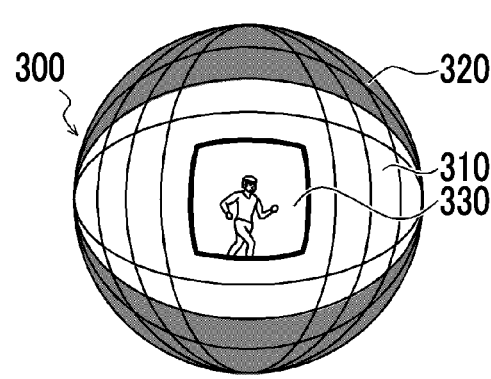
FIG. 15C 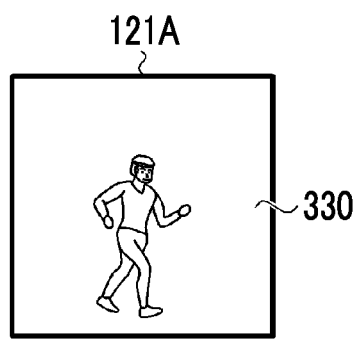 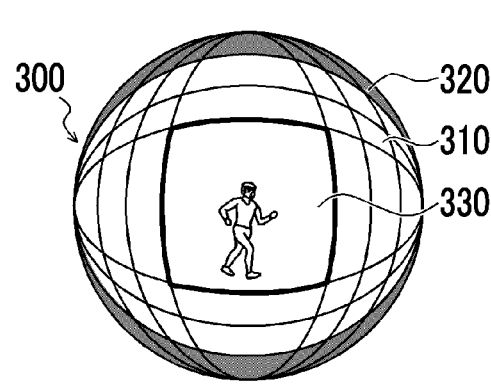
FIG. 15D 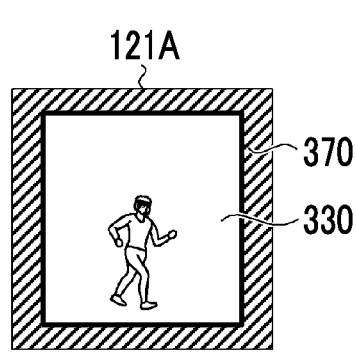 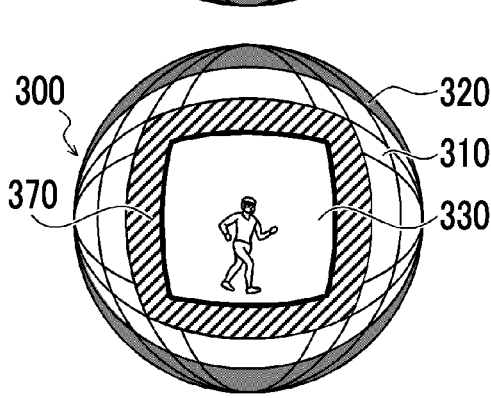

IMAGING CONTROL APPARATUS, IMAGING CONTROL METHOD, CAMERA SYSTEM, AND PROGRAM

CROSS-REFERENCE TO RELATED APPLICATIONS

This application is a Continuation of PCT International Application No. PCT/JP2015/068040 filed on Jun. 23, 2015, which claims priority under 35 U.S.C. § 119(a) to Japanese Patent Application No. 2014-182531 filed on Sep. 8, 2014. Each of the above applications is hereby expressly incorporated by reference, in their entirety, into the present application.

BACKGROUND OF THE INVENTION

1. Field of the Invention

The present invention relates to an imaging control device, an imaging control method, a camera system, and a program, and more particularly, to imaging control using a camera capable of rotating an imaging unit in a pan direction and a tilt direction.

2. Description of the Related Art

In the related art, a technology for displaying a first rectangular frame indicating an imaging limit field of view defined by a pan and tilt limit of a pan and tilt camera and a second rectangular frame indicating a current imaging range within the first rectangular frame in a device that performs pan and tilt control of the pan and tilt camera is known (see JP996-214206A (JP-H08-214206A) and JP1997-102902A (JP-H09-102902A)).

Further, an image processing technology for generating a wide-angle image from a plurality of captured images captured by a pan and tilt camera and generating data of a three-dimensional spherical image obtained by pasting a wide-angle image to a virtual spherical surface is known (See JP2010-049346A). A planar image at a desired angle with a center of a sphere being a viewpoint can be generated by performing image processing in which a portion of the three-dimensional spherical image is projected onto a display image plane.

SUMMARY OF THE INVENTION

As illustrated in FIG. 16, in a system that displays a live view image captured by an imaging unit 912 of a pan and tilt camera 910 on a portable terminal 920 of a user, in a case where the imaging unit 912 of the pan and tilt camera 910 is rotated in a pan direction and a tilt direction according to a movement of a subject, when a viewpoint movement of the imaging unit 912 of the pan and tilt camera 910 is compared with a viewpoint movement of the user holding the portable terminal 920 in his/her hand, the viewpoint movements are the same in that the subject is tracked, but it is understood that, in fact, the viewpoint movements are completely different viewpoint movements of a motion. It can be said that it is basically difficult for a general user to intuitively understand the viewpoint movement of the imaging unit 912 of the pan and tilt camera 910 due to such a difference in the viewpoint movement.

Further, a case where the technologies described in JP1996-214206A (JP-H08-214206A) and JP1997-102902A (JP-H09-102902A) are adopted in live view to display a first rectangular frame 942 indicating an imaging limit field of view defined by a pan and tilt limit of the pan and tilt camera 910 and a second rectangular frame 944 indicating a current imaging range within the first rectangular frame 942 on the portable terminal 920 of a user, and display the live view image captured by the imaging unit 912 of the pan tilt camera 910 within the second rectangular frame 944 as illustrated in FIG. 17 is considered. Then, a movement of the second rectangular frame 944 surrounding the subject image is understood to be a movement that is quite different from any of a pan and tilt movement (rotation) of the imaging unit 912 of the pan and tilt camera 910 and an actual movement of the subject viewed from the viewpoint of the imaging unit 912 of the pan and tilt camera 910. For example, in a case where the pan and tilt rotation of the imaging unit 912 of the pan and tilt camera 910 is completely synchronized with the actual movement of the subject illustrated in FIG. 16, the movement of the imaging unit 912 of the pan and tilt camera 910 is a rotation about a pan rotation axis and a tilt rotation axis, there is no relative actual movement of the subject viewed from the imaging unit 912 of the pan and tilt camera 910, and both are completely different from the movement of the second rectangular frame 944 (a case of linear movement in FIG. 17). It can be said that it is difficult for general user to intuitively recognize the movement of the imaging unit 912 of the pan and tilt camera 910 and the actual movement of the subject viewed from the viewpoint of the imaging unit 912 of the pan and tilt camera 910 due to such a difference in the movement even when the configuration in which the first rectangular frame 942 and the second rectangular frame 944 are displayed in the portable terminal 920 as described in JP1996-214206A (JP-H08-214206A) and JP1997-102902A (JP-H09-102902A) is adopted in the live view.

Further, a movement speed of the second rectangular frame 944 surrounding the subject image is considered to correspond to an operation amount of the user (for example, a drag operation amount) or an angular speed of pan and tilt, and when a user directly views the subject, the movement speed does not match an actual movement speed of the subject appearing in the user's eyes. Due to such a difference, even when the configuration in which the first rectangular frame 942 and the second rectangular frame 944 are displayed in the portable terminal 920 as described in JP1996-214206A (JP-H08-214206A) and JP1997-102902A (JP-H09-102902A) is adopted in live view, it is considered that a general user may be rather confused.

Further, since the imaging limit field of view (an edge of the imagable region) of the imaging unit 912 of the pan and tilt camera 910 is only displayed in a line shape as the first rectangular frame 942 as illustrated in FIG. 17, the user cannot recognize a width of the non-imagable region (corresponding to a width of a non-imagable angle range) outside the imaging limit field of view.

As described above, first, it is basically difficult for a general user to intuitively understand the viewpoint movement of the imaging unit 912 of the pan and tilt camera 910. Second, even when the technologies described in JP1996-214206A (JP-H08-214206A) and JP1997-102902A (JP-H09-102902A) are adopted for live view, it is difficult for the user to recognize the movement of the imaging unit 912 of the pan and tilt camera 910 and an actual movement of the subject viewed at the viewpoint of the imaging unit 912 of the pan and tilt camera 910. Third, even when the technologies described in JP1996-214206A (JP-H08-214206A) and JP1997-102902A (JP-H09-102902A) are applied to live view, the user cannot recognize a width of a non-imagable region. For these reasons, it can be said that it is actually difficult for the user to recognize an imaging limit field of view.

Further, an image processing technology for generating data of a three-dimensional spherical image from a wide-angle image, and an image processing technology for generating a two-dimensional planar image from data of a three-dimensional spherical image are known as described in JP2010-049346A, but JP2010-049346A lacks a viewpoint of displaying an imaging limit so that the imaging limit is easily understood when a subject having a high movement speed is live-viewed at a remote terminal of a user. Therefore, it can be said that it is basically difficult to combine the configurations described in JP1996-214206A (JP-H08-214206A) and JP1997-102902A (JP-H09-102902A) with the image processing technology described in JP2010-049346A. Even when they are combined, three-dimensional spherical image data is first created and then a planar image (corresponding to a live view image) at a desired angle viewed from the viewpoint of the imaging unit 912 is only generated. Therefore, the problem that it is difficult for the user to recognize the imaging limit field of view is not solved even when JP2010-049346A is referred to.

The present invention has been made in view of the above circumstances, and an object of the present invention is to enable a user to easily recognize an imaging limit in a case where an image captured by a camera in which an imaging unit is rotatable in a pan direction and a tilt direction is displayed on a remote device.

An aspect of the present invention is an imaging control device that controls a camera including an imaging unit including an imaging lens and an imaging element, a pan and tilt mechanism capable of rotating the imaging unit in a pan direction and a tilt direction, and a driving unit that drives the pan and tilt mechanism, the imaging control device comprising: a rotation instruction input unit that receives an input of a rotation instruction in at least one of a pan direction and a tilt direction of the pan and tilt mechanism of the camera; a rotation instruction output unit that outputs the rotation instruction to the camera; an image input unit that receives a live view image captured in a state in which the pan and tilt mechanism of the camera is driven according to the rotation instruction, from the camera; and a display control unit that causes the display unit to perform a display for superimposing the live view image input from the camera on a limit display image of a two-dimensionally displayed spherical surface indicating an imagable region and a non-imagable region respectively corresponding to within a rotation limit and out of the rotation limit of the imaging unit of the camera, and rotating the limit display image along the two-dimensionally displayed spherical surface according to the input of the rotation instruction.

According to this aspect, since the user can observe the live view changing according to the input of the rotation instruction with a sense of viewing the live view from the viewpoint of the camera and observe a width of the non-imagable region by observing the limit display image of the two-dimensional displayed spherical surface on which the live view image is superimposed and which rotates along the spherical surface according to the input of the rotation instruction, it is easy to intuitively recognize the imaging limit.

In an aspect of the present invention, in a case where the rotation instruction is an instruction for rotation to an angle exceeding a rotation limit of the imaging unit of the camera, the rotation instruction output unit sets an angle of the imaging unit of the camera within a rotation limit, and the display control unit moves the live view image beyond a boundary between the imagable region and the non-imagable region in the limit display image.

According to this aspect, since the live view image is moved beyond the boundary between the imagable region and the non-imagable region in the limit display image in a case where the rotation instruction is an instruction for rotation to an angle exceeding the rotation limit of the imaging unit of the camera, the user can recognize that the imaging control device reacts by viewing the live view image moving according to the rotation instruction. Since the rotation instruction input and the movement of the live view image always match each other, it is easy to perform an operation and the user can be prevented from feeling uncomfortable. The user can easily recognize that the rotation instruction input by the user is an instruction for rotation to an angle exceeding the rotation limit by simultaneously observing the display of the non-imagable region in the limit display image and the live view image.

In an aspect of the present invention, in a case where the rotation instruction is an instruction for rotation to an angle exceeding a rotation limit of the imaging unit of the camera or an angle reaching the rotation limit, the rotation instruction output unit sets an angle of the imaging unit of the camera within a rotation limit, and the display control unit performs a display of swinging the live view image at a boundary between the imagable region and the non-imagable region of the limit display image.

According to this aspect, in a case where the rotation instruction is an instruction for rotation to an angle exceeding a rotation limit of the imaging unit of the camera or an angle reaching the rotation limit, the display of swinging the live view image at a boundary between the imagable region and the non-imagable region of the limit display image is performed. Thus, the user can recognize that the device reacts according to the rotation instruction and can recognize that the rotation instruction input by the user is the instruction for rotation to an angle exceeding the rotation limit or the angle reaching the rotation limit.

In an aspect of the present invention, the display control unit causes a region in which imaging is not possible when the imaging unit of the camera is rotated toward a rotation limit close to a current angle among a clockwise rotation limit and a counterclockwise rotation limit, but imaging is possible when the imaging unit is rotated toward a rotation limit far from the current angle to be displayed within the limit display image.

According to this aspect, since the region in which imaging is not possible when the imaging unit of the camera is rotated toward a rotation limit close to a current angle among a clockwise rotation limit and a counterclockwise rotation limit, but imaging is possible when the imaging unit is rotated toward a rotation limit far from the current angle is displayed within the limit display image, the user can recognize that imaging is possible due to inversion to a rotation instruction in an opposite direction.

In an aspect of the present invention, the display control unit causes a still image captured in advance at a rotatable angle in the pan direction and the tilt direction by the imaging unit of the camera to be displayed in the imagable region corresponding to within the rotation limit in the limit display image.

According to this aspect, the user can accurately recognize a position of the live view image in an actual space by observing the still image displayed in the imagable region and a display of the non-imagable region, and can accurately recognize the non-imagable region.

In an aspect of the present invention, the display control unit causes a still image captured in an entire rotatable circumference in the pan direction and the tilt direction by the imaging unit of the camera to be displayed in the imagable region.

According to this aspect, it is possible to more accurately recognize a position of the live view image in an actual space by observing the still image captured at the entire rotatable circumference of the imaging unit of the camera and a display of the non-imagable region, and to more accurately recognize the non-imagable region.

In an aspect of the present invention, a zoom instruction input unit that receives an input of an optical or electronic zoom instruction of the live view image in the camera; and a zoom instruction output unit that outputs the zoom instruction to the camera are further included, and the image input unit receives the live view image zoomed by the camera according to the zoom instruction, from the camera, and the display control unit causes the display unit to display the live view image with a size corresponding to the zoom instruction.

According to this aspect, since the imagable region and the live view image within the limit display image are superimposed on the limit display image with a size corresponding to the zoom instruction, the user can accurately recognize the live view changing according to the zoom instruction.

In an aspect of the present invention, the display control unit causes the display unit to display the live view image separately from the live view image superimposed on the limit display image.

According to this aspect, the user can easily recognize a relationship between the current live view and the non-imagable region using the live view image in the limit display image (which is an image of a two-dimensionally displayed spherical surface) and accurately recognize the current live view using the live view image outside the limit display image (which is an image of a two-dimensionally displayed aspheric surface).

An aspect of the present invention relates to a camera system comprising an imaging control device and a camera.

An aspect of the present invention is an imaging control method of controlling a camera including an imaging unit including an imaging lens and an imaging element, a pan and tilt mechanism capable of rotating the imaging unit in a pan direction and a tilt direction, and a driving unit that drives the pan and tilt mechanism, the imaging control method comprising the steps of: receiving an input of a rotation instruction in at least one of a pan direction and a tilt direction of the pan and tilt mechanism of the camera; outputting the rotation instruction to the camera; receiving a live view image captured in a state in which the pan and tilt mechanism of the camera is driven according to the rotation instruction, from the camera; and superimposing the live view image input from the camera on a limit display image of a two-dimensionally displayed spherical surface indicating an imagable region and a non-imagable region respectively corresponding to within a rotation limit and out of the rotation limit of the imaging unit of the camera, and rotating the limit display image along the two-dimensionally displayed spherical surface according to the input of the rotation instruction.

An aspect of the present invention is a program for controlling a camera including an imaging unit including an imaging lens and an imaging element, a pan and tilt mechanism capable of rotating the imaging unit in a pan direction and a tilt direction, and a driving unit that drives the pan and tilt mechanism, the program causing a computer to execute the steps of: receiving an input of an instruction of rotation in at least one of a pan direction and a tilt direction of the pan and tilt mechanism of the camera; outputting the rotation instruction to the camera; receiving a live view image captured in a state in which the pan and tilt mechanism of the camera is driven according to the rotation instruction, from the camera; and superimposing the live view image input from the camera on a limit display image of a two-dimensionally displayed spherical surface indicating an imagable region and a non-imagable region respectively corresponding to within a rotation limit and out of the rotation limit of the imaging unit of the camera, and rotating the limit display image along the two-dimensionally displayed spherical surface according to the input of the rotation instruction. A non-transitory computer-readable recording medium having this program recorded thereon is also included in one aspect of the present invention.

According to the present invention, it is possible for a user to easily recognize the imaging limit field of view in a case where an image captured by a camera in which the imaging unit can be rotated in the pan direction and the tilt direction is displayed on a remote device.

BRIEF DESCRIPTION OF THE DRAWINGS

FIG. 1 is a perspective view illustrating an appearance of an example of a pan and tilt camera and a smartphone.

FIG. 4 is a block diagram illustrating an internal configuration example of main units of the present invention.

FIGS. 11A to 11C are illustrative diagrams that are used for description of a limit display image rotating along a two-dimensionally displayed spherical surface according to an input of a rotation instruction.

FIGS. 15A to 15D are illustrative diagrams that are used for description a relationship between a zoom instruction and a limit display image.

DESCRIPTION OF THE PREFERRED EMBODIMENTS

Figure 2:
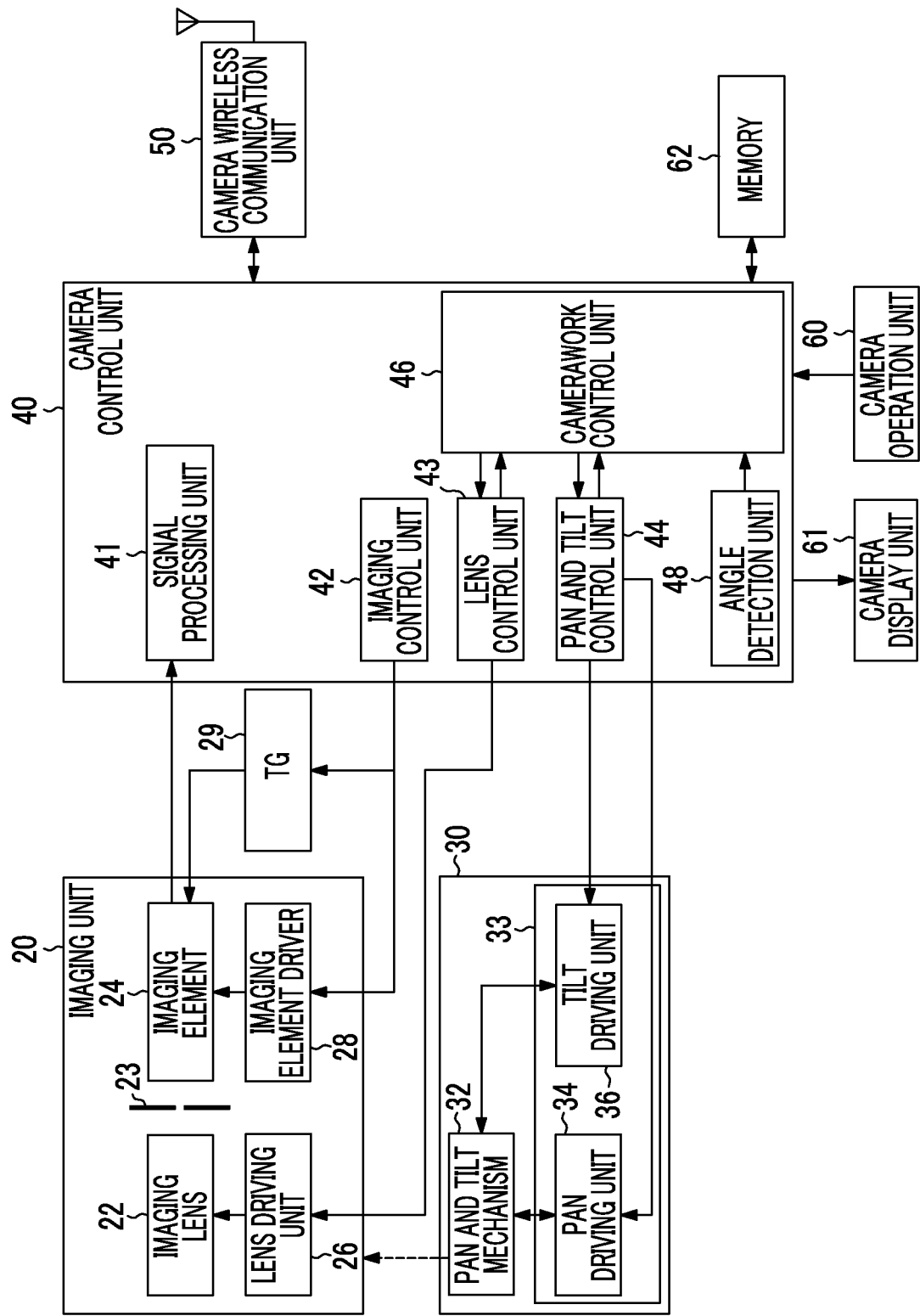
FIG. 2 is a block diagram illustrating an internal configuration of an example of a pan and tilt camera.

Hereinafter, embodiments of the present invention will be described with reference to the drawings.

[Example of Appearance of Pan and Tilt Camera and Smartphone]

As illustrated in FIG. 1 (a perspective view illustrating an example of a pan and tilt camera 10 and a smartphone 100), the pan and tilt camera 10 includes an device body 12, a pedestal 14, a holding unit 16 that is fixed to the pedestal 14 and rotatably holds the imaging unit 20, a dome cover 18 that covers the imaging unit 20, and an imaging unit 20.

The pedestal 14 is disposed to be rotatable about an axis in a vertical direction Z of the device body 12, and rotates about the axis in the vertical direction Z by a pan driving unit 34 (FIG. 2).

A holding unit 16 includes a gear 16A provided on the same axis as an axis in a horizontal direction X, and rotates the imaging unit 20 in up and down directions (tilt operation) according to a driving force delivered from a tilt driving unit 36 (FIG. 2) via the gear 16A.

The dome cover 18 is a dust-proof and drip-proof cover, and has, preferably, a spherical shell shape having a constant thickness, in which an intersection between the axis in the horizontal direction X and the axis in the vertical direction Z is a center of curvature so that optical performance of the imaging unit 20 does not change regardless of an optical axis direction L of the imaging unit 20.

Further, it is preferable for a tripod mounting unit (for example, tripod screw hole; not shown) to be provided on a back surface of the device body 12.

A power switch 19A and an imaging start button 19B for instructing start of imaging are provided in the pan and tilt camera 10, but the pan and tilt camera 10 includes a camera wireless communication unit 50 (FIG. 2) so that various instruction inputs for operations are applied from, mainly, an external terminal (in this example, smartphone) 100 through wireless communication with the smartphone 100.

[Internal Configuration Example of Pan and Tilt Camera]

FIG. 2 is a block diagram illustrating an internal configuration example of the pan and tilt camera 10 that is an example of the imaging control device.

This pan and tilt camera 10 can perform imaging of normal still images and moving images. The pan and tilt camera 10 roughly includes the imaging unit 20, a pan and tilt device 30, a camera control unit 40, and a camera wireless communication unit 50.

The imaging unit 20 includes, for example, an imaging lens 22, and an imaging element 24. The imaging lens 22 includes a monofocal lens or a zoom lens, and causes a subject image to be formed on an imaging surface of the imaging element 24. A focus lens, a variable magnification lens (in the case of the zoom lens), and a diaphragm 23 included in the imaging lens 22 are driven by a lens driving unit 26.

The imaging element 24 in this example is a color imaging element in which primary color filters of three primary colors including red (R), green (G), and blue (B) are arranged in a predetermined pattern (for example, a Bayer array, G stripe R/G full checkered, an X-Trans (registered trademark) array, or a honeycomb arrangement) for each pixel, and includes a complementary metal oxide semiconductor (CMOS) image sensor. The imaging element 24 is not limited to the CMOS image sensor, may be a charge coupled device (CCD) image sensor.

The imaging element 24 is driven by an imaging element driver 28 including, for example, a vertical driver and a horizontal driver, and a timing generator (TG) 29. A pixel signal according to the amount of incident light of subject light (digital signal corresponding to signal charge accumulated in each pixel) is read from the imaging element 24.

The pan and tilt device 30 includes, for example, a pan mechanism that rotates the imaging unit 20 in a horizontal direction (pan direction) relative to the device body 12 and a tilt mechanism that rotates the imaging unit 20 in a vertical direction (tilt direction) (hereinafter referred to as a "pan and tilt mechanism") 32, as illustrated in FIG. 1, the pan driving unit 34, and the tilt driving unit 36. The pan and tilt mechanism 32 includes a home position sensor that detects a reference position of a rotation angle (pan angle) in the pan direction, and a home position sensor that detects a reference position of a tilt angle in the tilt direction.

Each of the pan driving unit 34 and the tilt driving unit 36 includes a stepping motor and a motor driver, and outputs a driving force to a pan and tilt mechanism 32 to drive the pan and tilt mechanism 32. The pan driving unit 34 and the tilt driving unit 36 are hereinafter referred to as a pan and tilt driving unit 33.

The camera control unit 40 mainly includes a signal processing unit 41, an imaging control unit 42, a lens control unit 43, a pan and tilt control unit 44, a camera work control unit 46, and an angle detection unit 48.

The signal processing unit 41 performs signal processing such as offset processing, a gain control process including white balance correction and sensitivity correction, a gamma correction process, demosaic processing (demosaicing processing), or an RGB/YC conversion process on a digital image signal input from the imaging unit 20. Here, the demosaic processing is a process of calculating all of color information for each pixel from a mosaic image corresponding to a color filter array of a single-plate color imaging element, and is also referred to as a synchronization process. For example, in the case of an imaging element including color filters for three colors RGB, the demosaic processing is a process of calculating color information of all of RGB for each pixel from a mosaic image including RGB. Further, the RGB/YC conversion process is a process of generating luminance data Y and chrominance data Cb and Cr from RGB image data subjected to de-mosaic processing.

The imaging control unit 42 is a unit that instructs, for example, discharge of charges accumulated in a capacitor of each pixel of the imaging element 24 or reading of a signal corresponding to the charges accumulated in the capacitor via the imaging element driver 28 and the TG 29, and performs imaging control in the time-lapse imaging or the like.

The lens control unit 43 is a unit that controls the focus lens, the variable magnification lens, and the diaphragm 23 included in the imaging lens 22 via the lens driving unit 26, and performs, for example, autofocus (AF) control to move the focus lens to a focusing position. The AF control is performed by integrating an absolute value of a high-frequency component of a digital signal corresponding to an AF region, detecting a focusing position in which the integrated value (AF evaluation value) is maximized, and moving the focus lens to the detected focusing position.

The pan and tilt control unit 44 is a unit that controls the pan and tilt device 30.

The camera work control unit 46 outputs instruction signals for controlling the lens control unit 43 and the pan and tilt control unit 44.

The angle detection unit 48 is a unit that detects the pan angle and the tilt angle of the pan and tilt mechanism 32.

The camera wireless communication unit 50 is a unit that performs wireless communication with an external terminal such as the smartphone 100 illustrated in FIG. 1, and receives various instruction inputs for operations from the smartphone 100 through wireless communication. Further, the camera wireless communication unit 50 transmits the captured image or the like to the smartphone 100. The camera wireless communication unit 50 can transmit an image (live view image) captured by the imaging unit 20 and processed by the signal processing unit 41 to the smartphone 100. Thus, it is possible to record the image for recording such as a video in a recording medium inside or outside the smartphone 100 or display the live view image on the display unit of the smartphone 100.

The camera operation unit 60 includes, for example, the power switch 19A (FIG. 1) and the imaging start button 19B (FIG. 1) provided in the device body 12, and can perform an instruction input for the same operation as an instruction input for an operation from the smartphone 100.

The camera display unit 61 functions as an image display unit that displays a live view image, a played image, or the like, and functions as a user interface (UI unit) for displaying a menu screen and setting and inputting various parameters in cooperation with the camera operation unit 60.

The memory 62 includes, for example, a synchronous dynamic random access memory (SDRAM) including a storage region that temporarily stores sequentially captured images, and a work region in which various calculation processes are performed, or a read only memory (ROM) in which, for example, a program for imaging and various data necessary for control are stored.

[Example of Hardware Configuration of Smartphone]

Figure 3:
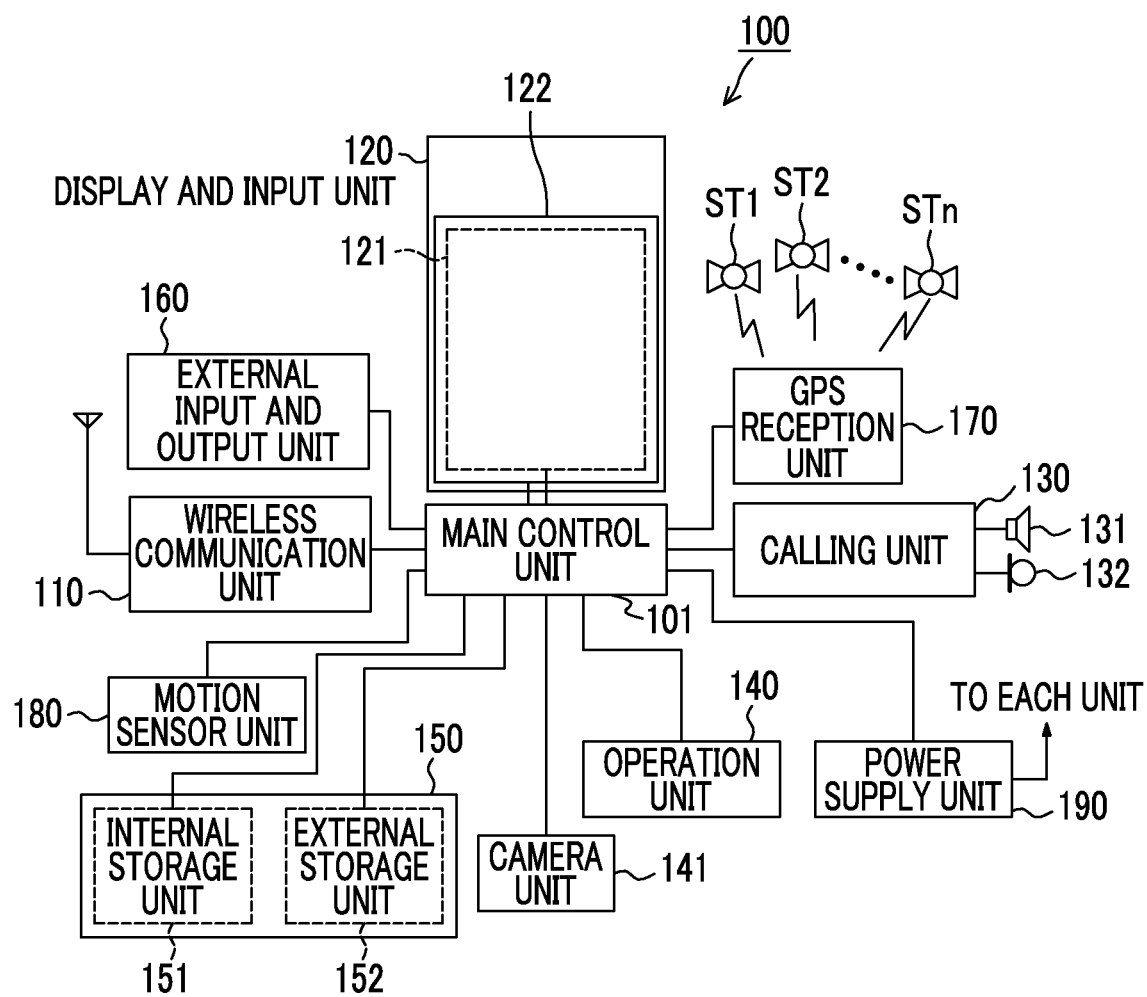
FIG. 3 is a block diagram illustrating a hardware configuration example of a smartphone which is an example of an imaging control device.

FIG. 3 is a block diagram illustrating a hardware configuration of the smartphone 100 illustrated in FIG. 1.

As illustrated in FIG. 3, main components of the smartphone 100 include a wireless communication unit 110, a display and input unit 120, a calling unit 130, an operation unit 140, a camera unit 141, a storage unit 150, an external input and output unit 160, a global positioning system (GPS) reception unit 170, a motion sensor unit 180, a power supply unit 190, and a main control unit 101. Further, a main function of the smartphone 100 includes a wireless communication function of performing mobile wireless communication via a base station device BS and a mobile communication network NW.

The wireless communication unit 110 performs wireless communication with the base station device BS accommodated in the mobile communication network NW according to an instruction of the main control unit 101. Using this wireless communication, transmission and reception of various types of file data such as audio data and image data, e-mail data, or the like, or reception of web data, streaming data, or the like is performed. In this example, the wireless communication unit 110 of the smartphone 100 transmits an instruction input for various operations to the pan and tilt camera 10, or receives a live view image, an image for recording, or the like from the pan and tilt camera 10.

The display and input unit 120 is a so-called touch panel that displays an image (a still image and a video), text information, or the like to visually deliver information to a user under the main control unit 101, and detects a user operation for the displayed information. The display and input unit 120 includes a display panel 121 and an operation panel 122. In a case in which a 3D image is viewed, it is preferable for the display panel 121 to be a 3D display panel.

The display panel 121 uses a liquid crystal display (LCD), an organic electro-Luminescence display (OELD), or the like as a display device.

The operation panel 122 is a device that is placed so that an image displayed on a display surface of the display panel 121 can be viewed, and detects one or a plurality of coordinates operated by a finger of a user or a stylus. If this device is operated by the finger of the user or the stylus, the operation panel 122 outputs a detection signal generated by the operation to the main control unit 101. Then, the main control unit 101 detects an operation position (coordinates) on the display panel 121 based on the received detection signal.

As illustrated in FIG. 1, the display panel 121 and the operation panel 122 of the smartphone 100 are integrally formed to constitute a display and input unit 120, but the operation panel 122 is arranged to completely cover the display panel 121. In a case in which this arrangement is adopted, the operation panel 122 may also have a function of detecting a user operation for a region other than the display panel 121. In other words, the operation panel 122 may include a detection region (hereinafter referred to as a display region) for an overlapping portion which overlaps the display panel 121, and a detection region (hereinafter referred to as a non-display region) for an outer edge portion which does not overlap the display panel 121, other than the display region.

A size of the display region and a size of the display panel 121 may completely match, but do not need to necessarily match. Further, the operation panel 122 may include two sensitive regions including the outer edge portion and an inner portion other than the outer edge portion. Further, a width of the outer edge portion may be appropriately designed according to, for example, a size of a housing 102. Further, a position detection scheme adopted in the operation panel 122 may include a matrix switch scheme, a resistive film scheme, a surface acoustic wave scheme, an infrared scheme, an electromagnetic induction scheme, a capacitive scheme, and the like, and any one of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the display and input unit 120 is provided.

The operation unit 140 is a hardware key using a key switch or the like, and receives an instruction from the user. For example, the operation unit 140 is mounted on a lower surface in a lower portion in a display portion of the housing 102 of the smartphone 100, and is a push button switch that is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. Further, the storage unit 150 includes an internal storage unit 151 built in the smartphone and an external storage unit 152 having a slot for an external memory that is detachable. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module (SIM)/user identity module (UIM) card connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wireless connected PDA, and an earphone. The external input-output unit can transfer data received from such an external device to each component inside the smartphone 100, or send internal data of the smartphone 100 to the external device.

The GPS reception unit 170 receives GPS signals that are transmitted from GPS satellites STI to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a three-axis acceleration sensor, and detects a physical motion of the smartphone 100 according to an instruction of the main control unit 101. By detecting the physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function includes an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying an image on the display and input unit 120 based on image data (data of a still image or a video) such as received data or downloaded streaming data. The image processing function refers to a function of the main control unit 101 decoding the image data, performing image processing on a result of the decoding, and displaying the image on the display and input unit 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display region of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion that overlaps the display panel 121 (display region) or the other outer edge portion (non-display region) that does not overlap the display panel 121, and controlling the sensitive region of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD). Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101. In the smartphone 100 illustrated in FIG. 1, the camera unit 141 is mounted on the same surface as the display and input unit 120, but a mounting position of the camera unit 141 is not limited thereto and may be mounted on a back surface of the display and input unit 120. Alternatively, a plurality of camera units 141 may be mounted. In a case in which the plurality of camera units 141 are mounted, switching to the camera unit 141 provided for imaging may be performed and imaging may be performed using only such a camera unit 141, or imaging may be performed using the plurality of camera units 141 at the same time.

Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using the 3-axis acceleration sensor, or in combination with the 3-axis acceleration sensor. Of course, the image from the camera unit 141 can also be used within the application software.

In this example, by downloading application software for operating the pan and tilt camera 10 over a network or the like, storing the application software in the storage unit 150, and operating the main control unit 101 according to the downloaded application software using the application processing function of the smartphone 100, the general-purpose smartphone 100 functions as a user interface (UI unit) for operating the pan and tilt camera 10.

FIG. 4 is a block diagram illustrating an internal configuration example of main units of the present invention. In FIG. 4, the smartphone 100 is an example of the imaging control device of the present invention.

The wireless communication unit 110 of the smartphone 100 includes an image input unit 202 that receives (inputs) a live view image from the pan and tilt camera 10, a pan and tilt angle input unit 204 that receives (inputs) the pan angle and the tilt angle of the imaging unit 20 of the pan and tilt camera 10 from the pan and tilt camera 10, a rotation instruction output unit 206 that transmits (outputs) the rotation instruction to the pan and tilt camera 10 through wireless communication, and a zoom instruction output unit 208 that transmits (outputs) a zoom instruction to the pan and tilt camera 10 through wireless communication.

When the rotation instruction is output to the pan and tilt camera 10 by the rotation instruction output unit 206, the image input unit 202 receives, from the pan and tilt camera 10, the live view image captured in a state in which the pan and tilt mechanism 32 of the pan and tilt camera 10 is driven according to the rotation instruction. Further, when the rotation instruction is output to the pan and tilt camera 10 by the rotation instruction output unit 206, the pan and tilt angle input unit 204 receives, from the pan and tilt camera 10, the pan angle and the tilt angle of the imaging unit 20 in a state in which the pan and tilt mechanism 32 of the pan and tilt camera 10 is driven according to the rotation instruction.

In a case where a zoom instruction is output to the pan and tilt camera 10 by the zoom instruction output unit 208, the image input unit 202 receives the live view image captured at an angle of view according to the zoom instruction (that is, a zoomed live view image) from the pan and tilt camera 10.

The display and input unit 120 of the smartphone 100 has a configuration in which the display panel 121 (which is an aspect of the display unit) and the operation panel 122 are arranged in an overlapping manner as described with reference to FIG. 1, and is used as a rotation instruction input unit 212 that receives an input of a rotation instruction in at least one of the pan direction and the tilt direction of the pan and tilt mechanism 32 of the pan and tilt camera 10.

The storage unit 150 of the smartphone 100 is used as a limit display image information storage unit 222 that stores information on the limit display image in each combination of the pan angle and the tilt angle within the rotation limit. The information on the limit display image stored in the limit display image information storage unit 222 is not limited to the limit display image. For example, it is conceivable that information indicating a contour (edge) of the imagable region in the limit display image is stored in the limit display image information storage unit 222 as the information on the limit display image. The information on the limit display image may include information indicating a method of drawing a latitude line and a longitude line of a spherical surface.

The main control unit 101 of the smartphone 100 includes a rotation limit determination unit 232 that determines whether or not the rotation instruction input to the rotation instruction input unit 212 is an instruction for rotation to an angle exceeding the rotation limit of the imaging unit 20 of the pan and tilt camera 10, an information selection unit 234 that selects information on the limit display image corresponding to the pan angle and the tilt angle of the imaging unit 20 of the pan and tilt camera 10 from information on the plurality of limit display images stored in the limit display image information storage unit 222, a display control unit 236 that superimposes the live view image input from the pan and tilt camera 10 on the limit display image, and an execution control unit 238 that controls execution of each unit of the smartphone 100 according to a program stored in the storage unit 150.

Further, the limit display image 300 (FIGS. 6 to 8) is a image of a two-dimensionally displayed spherical surface indicating the imagable region and the non-imagable region respectively corresponding to within the rotation limit and out of the rotation limit of the imaging unit 20 of the pan and tilt camera 10. The limit display image 300 rotates along the two-dimensionally displayed spherical surface according to the input of the rotation instruction under the control of the display control unit 236.

Further, in a case where it is determined by the rotation limit determination unit 232 that the rotation instruction is an instruction for rotation to an angle exceeding the rotation limit, the limit display image 300 is switched to a display indicating that the rotation indication is a rotation indication exceeding the rotation limit under the control of the display control unit 236. Further, the rotation limit determination unit 232 may determine whether or not the rotation indication is an instruction for rotation to an angle reaching the rotation limit, and may be switched to a display indicating that the rotation indication is an instruction for rotation to an angle reaching the rotation limit under the control of the display control unit 236 when the rotation indication is an instruction for rotation to an angle reaching the rotation limit.

The rotation limit of the imaging unit 20 of the pan and tilt camera 10 differs according to a model of the pan and tilt camera 10. In particular, the rotation limit of the pan and tilt camera 10 is different according to a structure of the pan and tilt mechanism 32. Further, an actually rotatable angle range may be set to be narrower than a physically rotatable angle range for the purpose of privacy protection or the like.

Figure 5A:
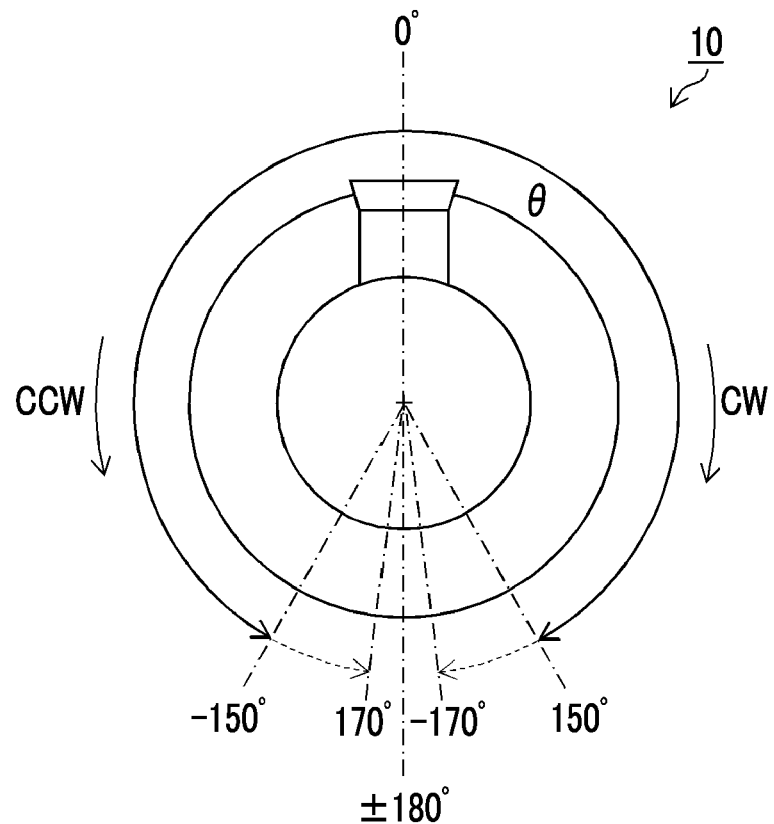
FIG. 5A is a plan view of a pan and tilt camera illustrating an example of a rotation limit in a pan direction.
Figure 5B:
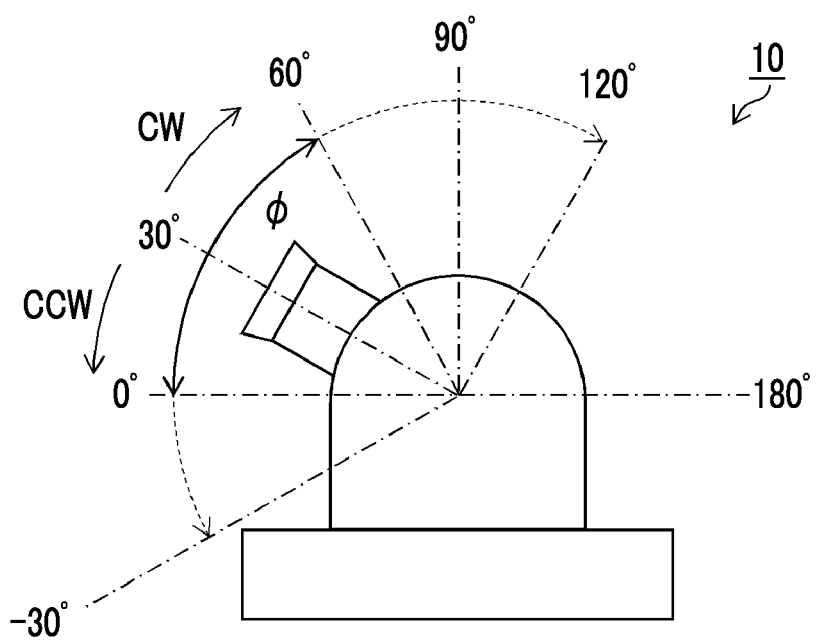
FIG. 5B is a side view of the pan and tilt camera illustrating an example of a rotation limit in a tilt direction.

FIGS. 5A and 5B illustrate an example of the rotation limit of the imaging unit 20 of the pan and tilt camera 10. For convenience of description of this embodiment, it is assumed that the rotatable angle range in the pan direction is −150° to 150°, and a rotatable angle range in the tilt direction is limited to 0° to 60°. In FIGS. 5A and 5B, CW indicates clockwise rotation and CCW indicates counterclockwise rotation. In the present invention, the rotatable angle range is not limited to the angle range illustrated in FIG. 5. Although the case where the rotatable angle range is narrow has been introduced in FIG. 5 in order to facilitate understanding of the present invention, the rotatable angle range of the pan is −170° to 170° and the rotatable angle range of the tilt is −30° to 120°, as indicated by dotted arrows in FIGS. 5A and 5B.

Figure 6:
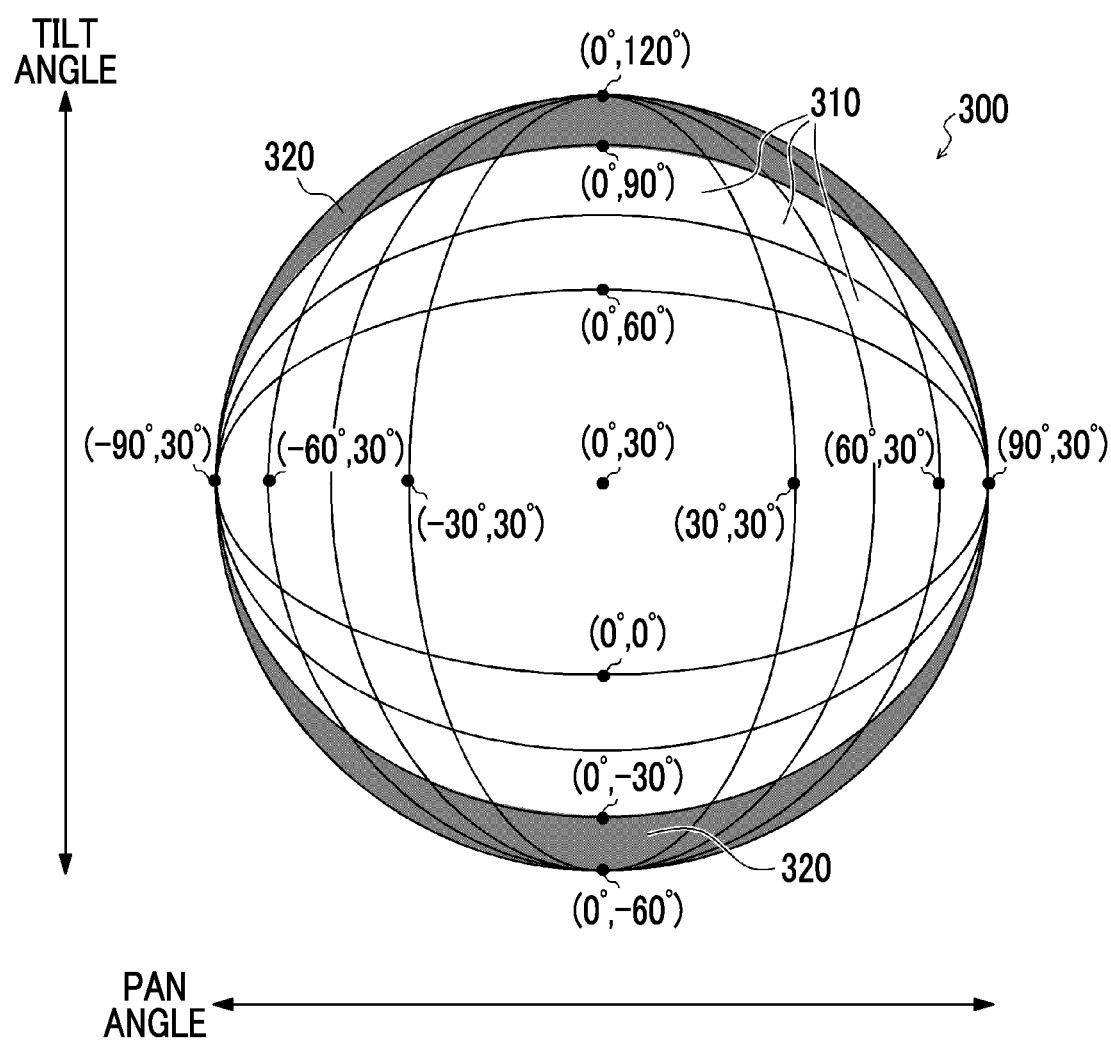
FIG. 6 is a first illustrative diagram that is used for description of a relationship between a rotation limit and a non-imagable region of a limit display image.
Figure 7:
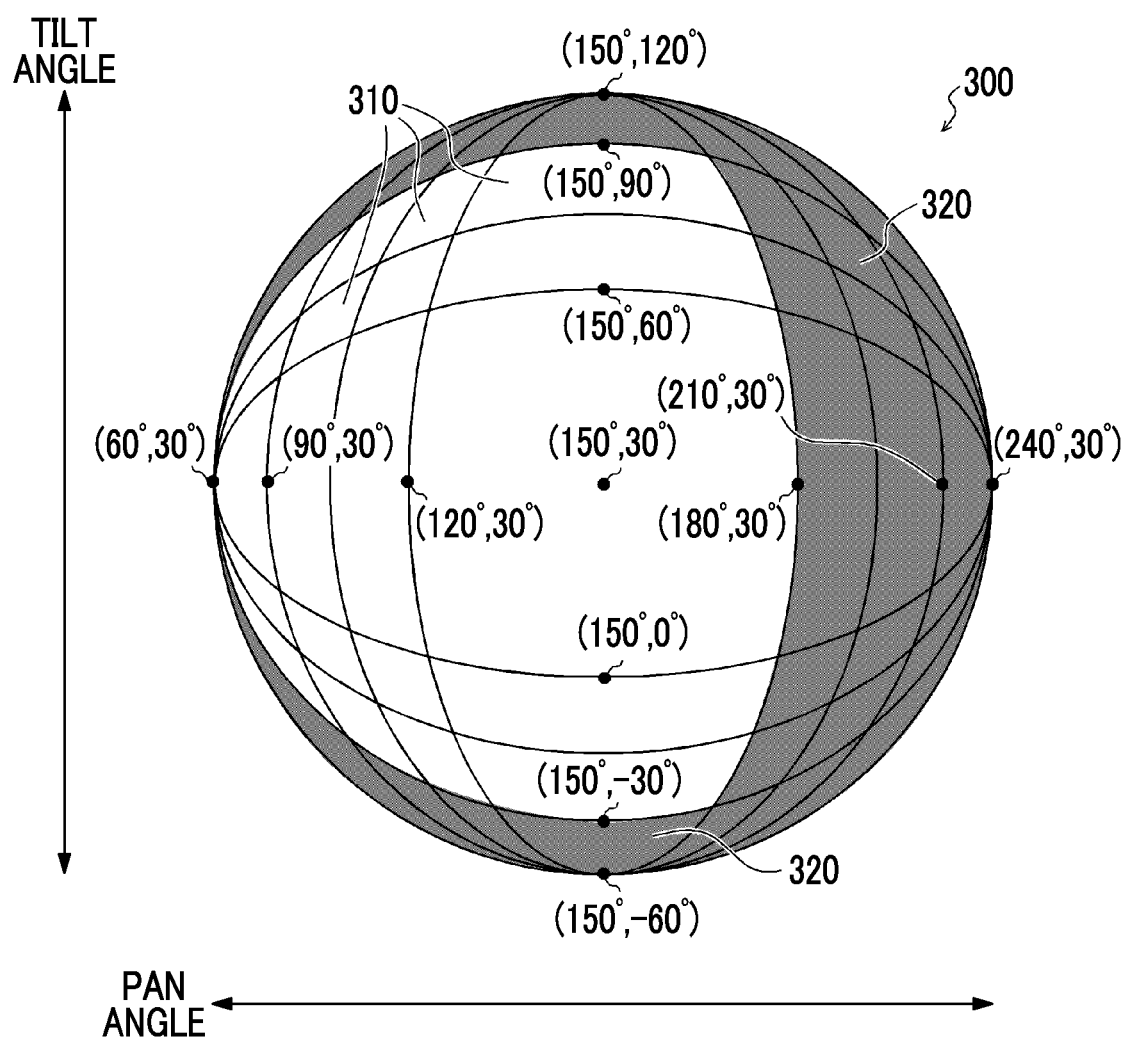
FIG. 7 is a second illustrative diagram that is used for description of the relationship between a rotation limit and a non-imagable region of a limit display image.
Figure 8:
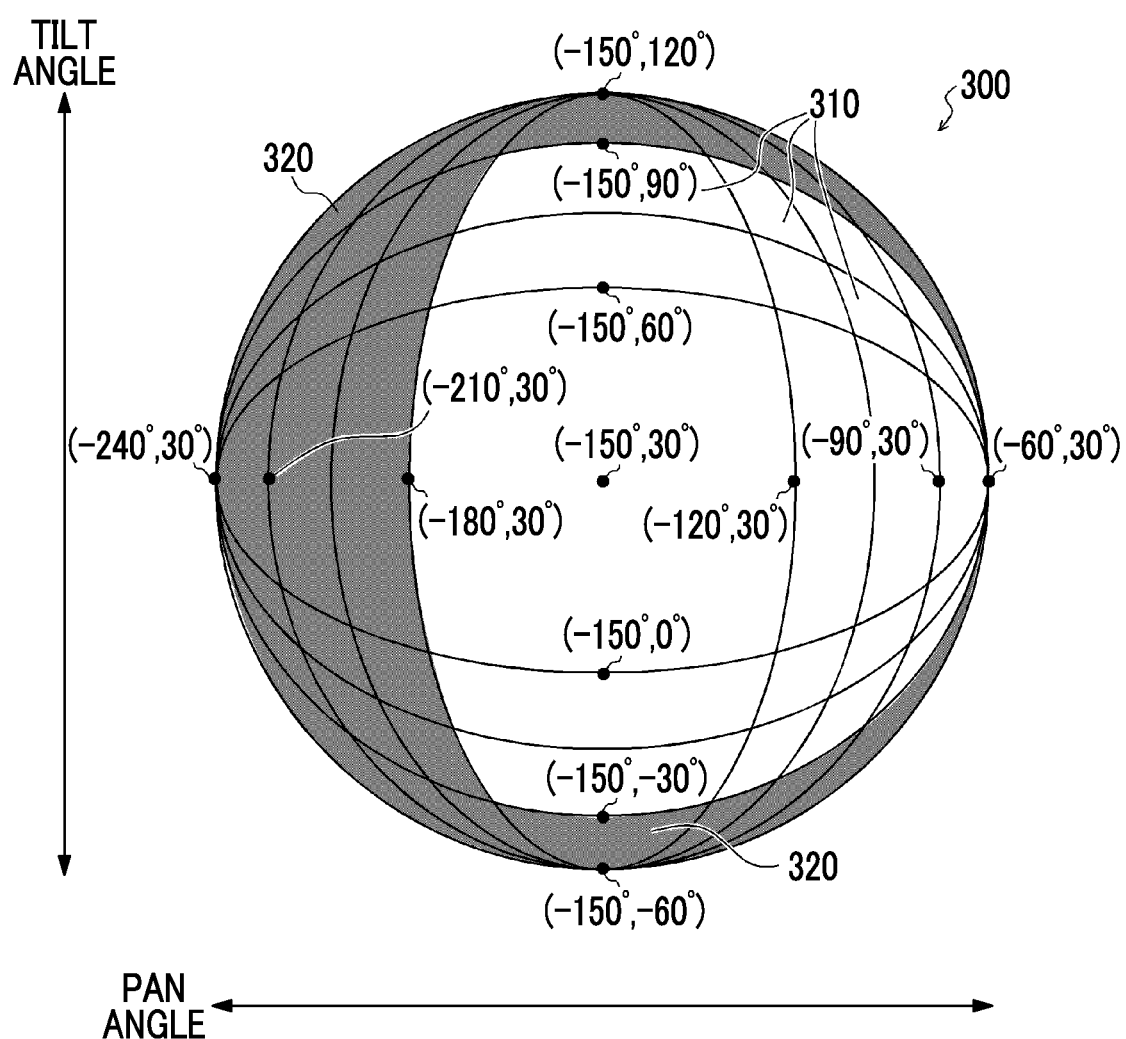
FIG. 8 is a third illustrative diagram that is used for description of the relationship between a rotation limit and a non-imagable region of a limit display image.

FIG. 6 illustrates an example of the limit display image 300 in a case where the pan angle of the imaging unit 20 is 0° and the tilt angle is 30°. FIG. 7 illustrates an example of the limit display image 300 in a case where the pan angle of the imaging unit 20 is 150° and the tilt angle is 30°. FIG. 8 illustrates an example of the limit display image 300 in a case where the pan angle of the imaging unit 20 is −150° and the tilt angle is 30°. Angles in parentheses in the figures indicate angles in order of the pan angle θ and the tilt angle ϕ from the left.

The imagable region 310 in the pan direction and the tilt direction is wider by the angle of view of the pan and tilt camera 10 than the angle range within the rotation limit. In a case where the angle of view of the pan and tilt camera 10 is 60° (±30°) in both of the horizontal direction (pan direction) and the vertical direction (tilt direction), the imagable region 310 is wider by the angle of view (60°) than the angle range (the pan angle θ is −150° to 150° and the tilt angle ϕ is 0° to 60°) within the rotation limit. That is, the imagable region 310 of this example is assumed to be −180° to 180° at the pan angle θ and −30° to 90° at the tilt angle ϕ. However, the angle of view of the pan and tilt camera 10 varies according to a model of the pan and tilt camera 10 (particularly, a specification of the imaging unit 20) and a zoom magnification.

The limit display image 300 illustrated in FIGS. 6, 7, and 8 is the following image.

(1) An image of a two-dimensionally displayed spherical surface. This is equivalent to an image obtained by projecting a three-dimensional spherical image onto a plane.

(2) A latitude line and a longitude line on the spherical surface respectively correspond to a line (equal pan angle line) indicating an equal angle in the pan direction of the imaging unit 20 of the pan and tilt camera 10 and a line (equal tilt angle line) indicating an equal angle in the tilt direction.

(3) The imagable region 310 and the non-imagable region 320 respectively corresponding to within the rotation limit and out of the rotation limit of the imaging unit 20 of the pan and tilt camera 10 are shown.

(4) The non-imagable region 320 is displayed with a lower brightness than that of the imagable region 310. For example, the non-imagable region 320 is displayed in black. Hereinafter, the display with a lower brightness than that of the imagable region 310 is referred to "blackout display".

(5) A current pan angle and a current tilt angle (or a pan angle and a tilt angle corresponding to the rotation instruction) of the imaging unit 20 of the pan and tilt camera 10 are set as a center point of the sphere. Therefore, the live view image captured by the imaging unit 20 of the pan and tilt camera 10 is superimposed on a center portion of the limit display image 300.

(6) The live view image is pasted to an inner surface of the sphere and superimposed.

(7) The spherical surface is not limited to a case where a true sphere is two-dimensionally displayed. An elliptical sphere may be two-dimensionally displayed or a portion of a true circle or an elliptical sphere may be deformed so that the live view image can be pasted without being deformed (for example, a central portion of the sphere is made in a columnar shape) and may be two-dimensionally displayed.

In FIGS. 6, 7, and 8, lines (longitude lines) indicating equal angles in the pan direction and lines (latitude lines) indicating equal angles in the tilt direction are drawn so that it can be easily visually recognized that the limit display image is a two-dimensionally displayed spherical surface. Preferably, the longitude lines and the latitude lines are drawn in the limit display image, but the present invention includes a case where the longitude lines and the latitude lines are not drawn. In FIGS. 6, 7, and 8, black dots indicating reference angles and numerical values of the reference angles (pan angle θ and tilt angle ϕ) are drawn in order to facilitate recognition of the pan angle and the tilt angle. However, the black dots and the angles may not be drawn in an actual limit display image.

Figure 9:
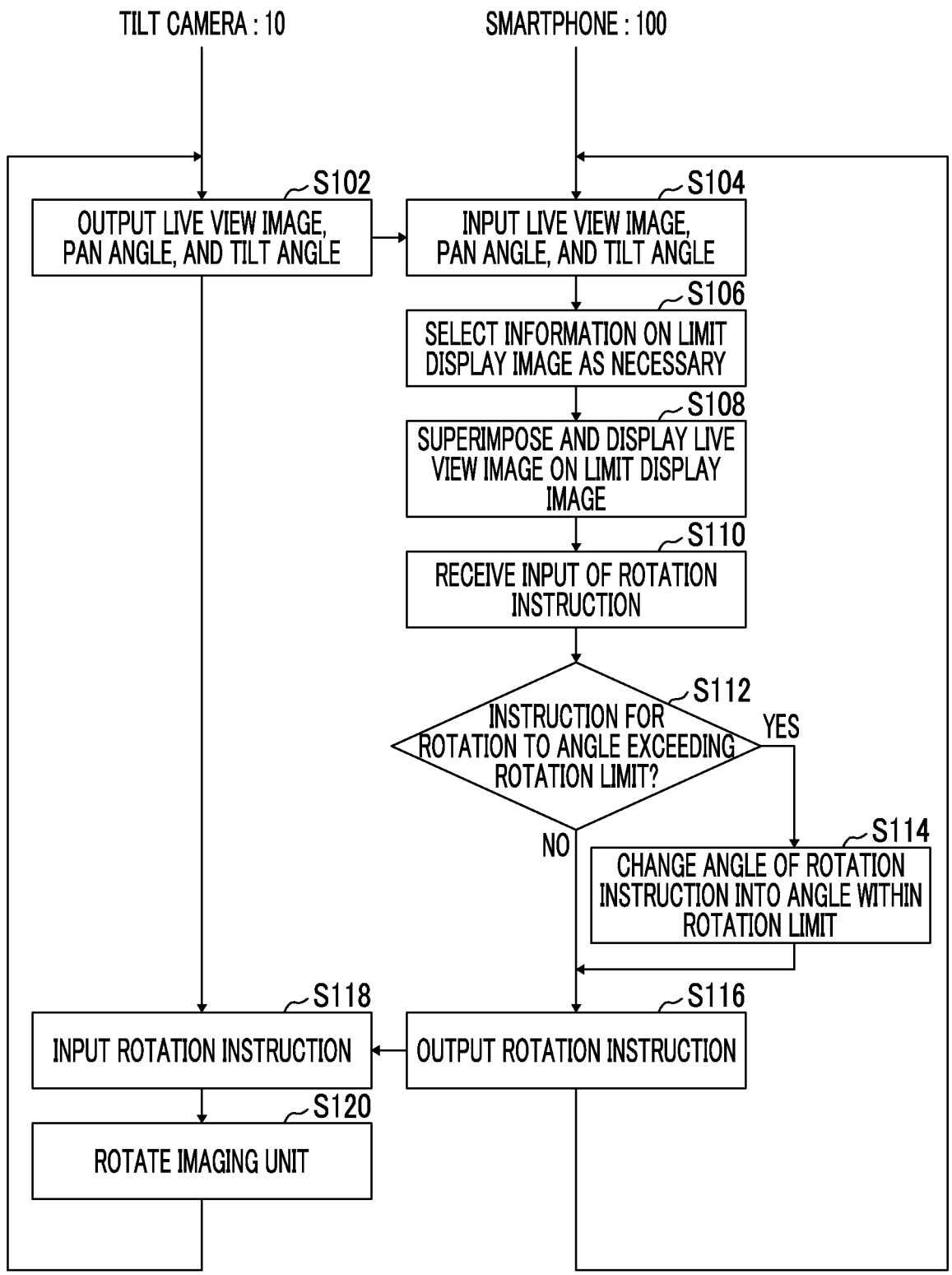
FIG. 9 is a flowchart illustrating a flow of an example of a display control process.

FIG. 9 is a flowchart illustrating a flow of an example of the display control process. In FIG. 9, the process of the smartphone 100 is executed according to a program stored in the storage unit 150 of the smartphone 100 by the execution control unit 238 of the smartphone 100. The process of the pan and tilt camera 10 is executed according to a program stored in the memory 62 of the pan and tilt camera 10 by the camera control unit 40 of the pan and tilt camera 10.

The pan and tilt camera 10 is in a state in which a power switch 19A and an imaging start button 19B have already been turned on, initialization of the pan and tilt mechanism 32, the pan and tilt driving unit 33, and the like has ended, and imaging of the subject has started.

The pan and tilt camera 10 transmits (outputs) the live view image captured by the imaging unit 20, and the pan angle and the tilt angle of the imaging unit 20 to the smartphone 100 using the camera wireless communication unit 50 (step S102). The wireless communication unit 110 of the smartphone 100 functions as the image input unit 202 and the pan and tilt angle input unit 204, and receives (inputs) the live view image, the pan angle, and the tilt angle (step S104).

The pan and tilt camera 10 of this example performs capturing of a live view image at regular time intervals and transmits the live view image to the smartphone 100 at regular time intervals. Here, the "regular time intervals" are not limited to completely the same time intervals, but includes a case where fluctuation within a certain allowable range occurs. Further, the present invention is not limited to a case where imaging time intervals and transmission time intervals of the live view image are regular. The pan and tilt camera 10 may perform capturing and transmission output of the live view imaging at undefined time intervals according to a load state of each unit of the pan and tilt camera 10, a communication environment, or the like. For example, in a case where it is detected that a change amount of the captured image is equal to or less than a threshold value, in a case where it is detected that a load of a process in the pan and tilt camera 10 is out of an allowable range, or in a case where the communication environment is out of an allowable range, at least one of the imaging and the transmission may be temporarily stopped. Since imaging time information (so-called time stamp) is added to the live view image, the smartphone 100 can detect the imaging time from the imaging time information added to the live view image.

The information selection unit 234 of the smartphone 100 selects information on the limit display image corresponding to the pan angle and the tilt angle input from the pan and tilt camera 10 from among the information on the limit display image stored in the storage unit 150 functioning as the limit display image information storage unit 222 (Step S106).

Figure 10:
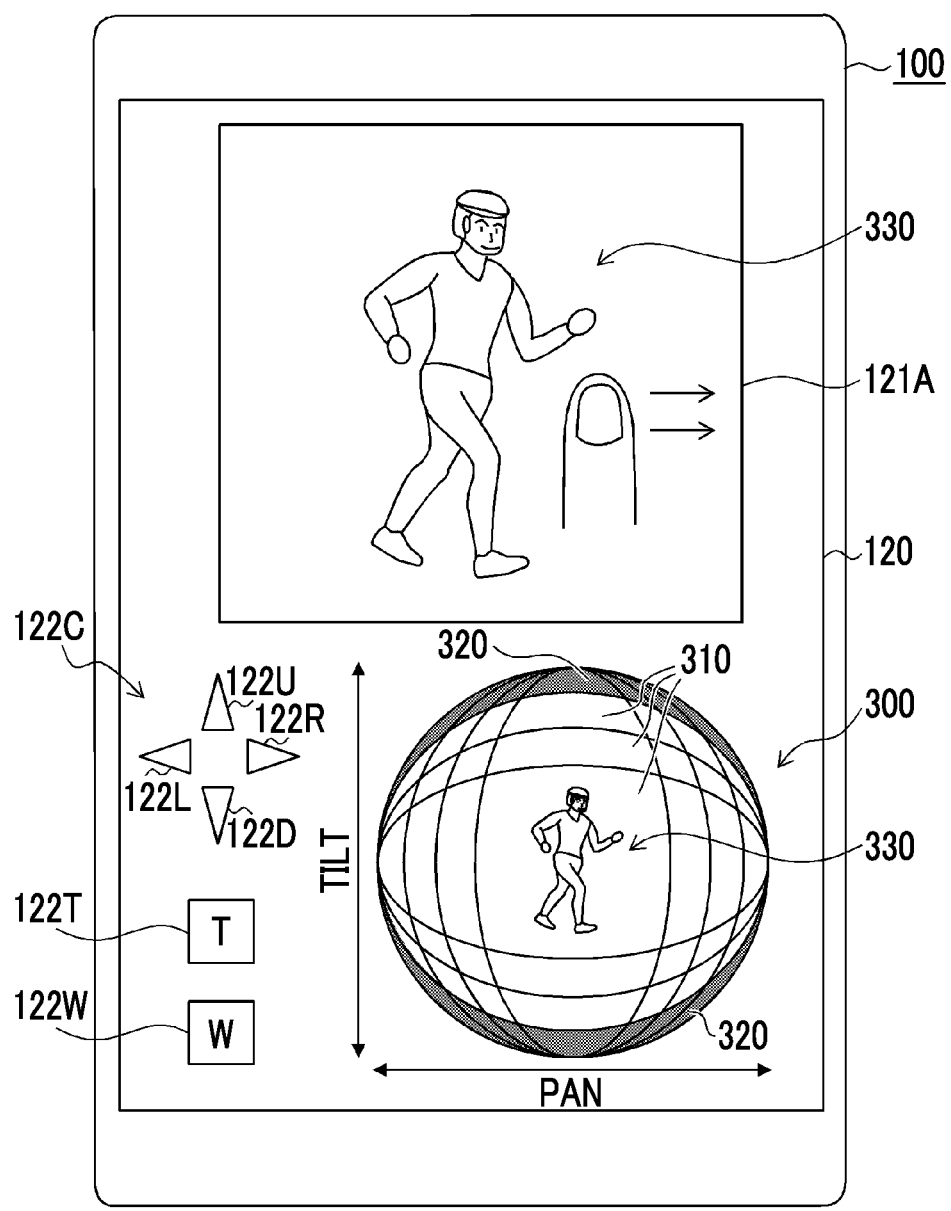
FIG. 10 is an illustrative diagram illustrating a display example of a limit display image and a live view image.

As illustrated in FIG. 10, the display control unit 236 of the smartphone 100 displays the live view image 330 input from the pan and tilt camera 10 so that the live view image 330 is superimposed on a center of the limit display image 300 of the spherical surface two-dimensionally displayed on the display and input unit 120 (step S108). In the example illustrated in FIG. 10, the live view image 330 is also displayed in a live view window 121A outside the limit display image 300.

The display and input unit 120 functioning as the rotation instruction input unit 212 of the smartphone 100 receives an input of a rotation instruction in at least one of the pan direction and the tilt direction (step S110). The input of the rotation instruction is received by an operation outside the limit display image 300 of the display and input unit 120. In the example illustrated in FIG. 10, in a case where a user rapidly slides while performing touch with a finger or the like in the live view window 121A of the display and input unit 120 (that is, in a case where "flick" is performed), an input is received as a rotation instruction. For example, when a finger or the like is slid in a left direction, this is determined to be a rotation instruction to perform pan counterclockwise CCW (left direction) in FIG. 5A. For example, when a finger or the like is slid in a right direction, this is determined to be a rotation instruction to perform pan clockwise CW (right direction) in FIG. 5A. For example, when a finger or the like is slid in an up direction, this is determined to be a rotation instruction to perform tilt clockwise CCW (up direction) in FIG. 5B. For example, when a finger or the like is slid in a down direction, this is determined to be a rotation instruction to perform tilt counterclockwise CCW (down direction) in FIG. 5B.

Further, in FIG. 10, the rotation instruction can be input by a cross key 122C including an icon (up key 122U) indicating an up direction, an icon indicating a down direction (down key 122D), an icon indicating a left direction (left key 122L), and an icon indicating a right direction (right key 122R). In a case where the left key 122L is pressed, this is determined to be a rotation instruction to perform pan in a counterclockwise CCW (left direction) in FIG. 5A. In a case where the right key 122R is pressed, this is determined to be a rotation instruction to perform pan in a clockwise CW (right direction) in FIG. 5A. In a case where the up key 122U is pressed, this is determined to be a rotation instruction to perform tilt in a clockwise CW (up direction) in FIG. 5B. In a case where the left key 122D is pressed, this is determined to be a rotation instruction to perform tilt in a counterclockwise CCW (down direction) in FIG. 5B.

The rotation limit determination unit 232 of the smartphone 100 determines whether or not the input rotation instruction is an instruction for rotation to an angle exceeding the rotation limit of the pan and tilt mechanism 32 of the pan and tilt camera 10 (step S112). In a case where the rotation instruction is an instruction for rotation to an angle exceeding the rotation limit (YES in step S112), the execution control unit 238 of the smartphone 100 changes the angle of the rotation instruction into an angle within the rotation limit (step S114).

The wireless communication unit 110 of the smartphone 100 functions as the rotation instruction output unit 206, and transmits (outputs) the rotation instruction to the pan and tilt camera 10 (step S116). The camera wireless communication unit 50 of the pan and tilt camera 10 receives (inputs) the rotation instruction (step S118).

The pan and tilt driving unit 33 of the pan and tilt camera 10 rotates the imaging unit 20 of the pan and tilt camera 10 by driving the pan and tilt mechanism 32 of the pan and tilt camera 10 according to the rotation instruction (step S120).

Returning to step S102, the live view image captured in a state in which the pan and tilt mechanism 32 of the pan and tilt camera 10 is driven according to the rotation instruction and the pan angle, and the tilt angle of the imaging unit 20 of the pan and tilt camera 10 are transmitted (output) to the smartphone 100 by the camera wireless communication unit 50 (step S102). The wireless communication unit 110 of the smartphone 100 receives (inputs) the live view image, the pan angle, and the tilt angle (step S104).

When there is a change in the pan angle and the tilt angle, the information on the limit display image is selected again (step S106), the limit display image corresponding to the current pan angle and the current tilt angle is displayed, and a new live view image is superimposed on this limit display image and displayed (step S108).

In FIGS. 11A, 11B, and 11C, the display of the live view image 330 of the live view window 121A is shown on the left side, and the display of the limit display image 300 is shown on the right side. For example, if a slide operation for instructing a counterclockwise CCW of the pan is performed in the live view window 121A on the left side of FIG. 11A, the limit display image 300 rotates in a left direction along the two-dimensionally displayed spherical surface as indicated by an arrow on the right side of FIG. 11A, and the limit display image 300 is displayed as shown on the right side of FIG. 11B. Further, if a slide operation for instructing a counterclockwise CCW of the pan and a counterclockwise CCW of the tilt is performed in the live view window 121A on the left side of FIG. 11B, the limit display image 300 rotates in a left and down direction along the two-dimensionally displayed spherical surface as indicated by an arrow on the right side of FIG. 11B, and the limit display image 300 is displayed as shown on the right side of FIG. 11C. Thus, the limit display image 300 indicating the imagable region 310 and the non-imagable region 320 rotates along the two-dimensionally displayed spherical surface according to the input of the rotation instruction. Since a movement of such a limit display image is similar to a movement of the viewpoint of the imaging unit 20 of the pan and tilt camera 10 according to the rotation instruction, the user can accurately recognize the imaging limit with a sense of observation from the viewpoint of the imaging unit 20 of the pan and tilt camera 10.

<Variation of Display Control>

(Display Control for Instruction of Rotation to Angle Exceeding Rotation Limit)

In a case where an instruction of rotation to an angle exceeding the rotation limit is input by the user, when the angle of the imaging unit 20 of the pan and tilt camera 10 is merely set to the rotation limit, the user may be confused without knowing whether or not the imaging control device (smartphone 100) does not react to a user's instruction input at all. Further, when an indication indicating that the angle exceeds the rotation limit is merely output using a text or voice message, the user can recognize that the device reacts, but the image does not change according to the instruction input from the user. Accordingly, it is considered that the user feels discomfort due to no correspondence between the user's instruction input and the image.

Hereinafter, a variation of display control in which a change is applied to the limit display image and the live view image according to an instruction for rotation to an angle exceeding the rotation limit or an instruction for rotation to the angle reaching the rotation limit so that the user cannot feel discomfort will be described.

Figure 12:
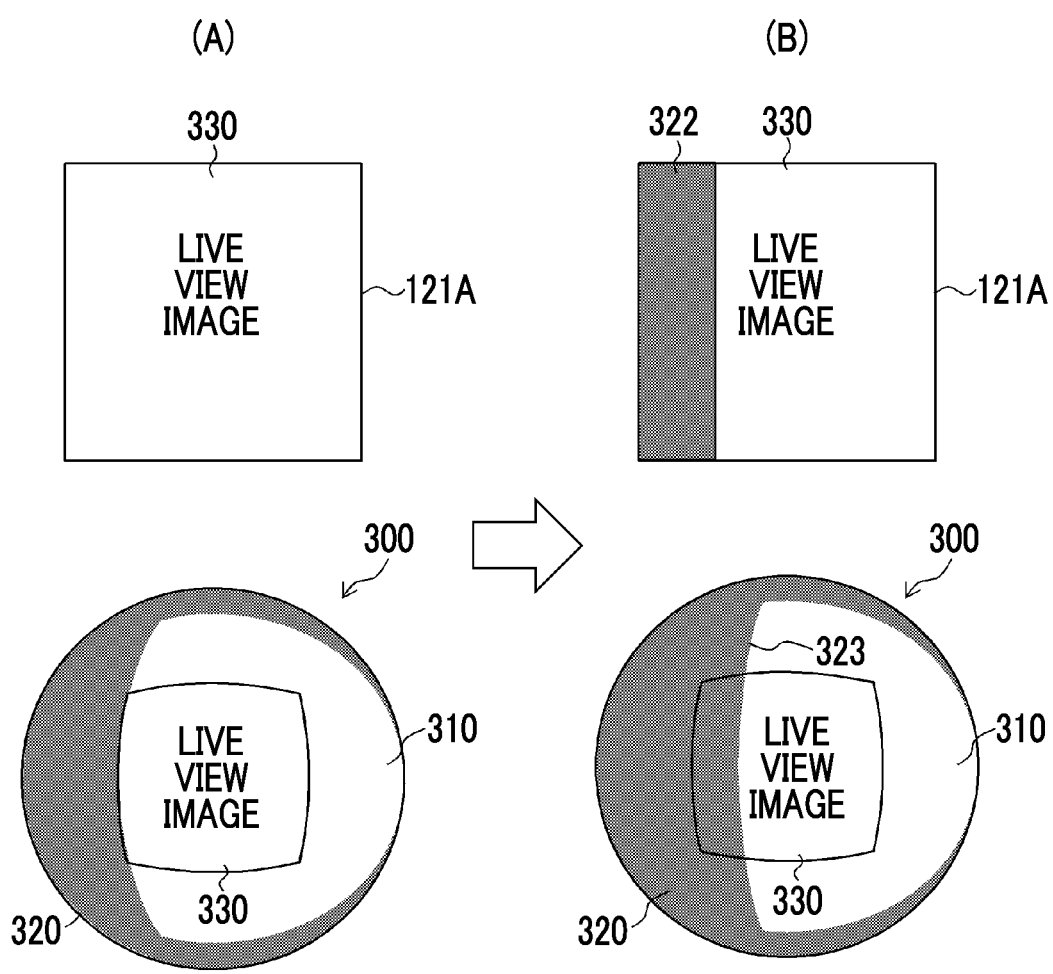
FIG. 12 is an illustrative diagram of display control for an instruction for rotation to an angle exceeding a rotation limit.

In the first variation, for example, when the imaging unit 20 of the pan and tilt camera 10 reaches the rotation limit and the display illustrated in FIG. 12A is performed by the display control unit 236, in a case where the instruction for rotation to the angle exceeding the rotation limit of the imaging unit 20 of the pan and tilt camera 10 is performed, the rotation instruction output unit 206 sets the angle of the imaging unit 20 of the pan and tilt camera 10 within the rotation limit, and the display control unit 236 moves the live view image 330 beyond a boundary 323 between the imagable region 310 and the non-imagable region 320 in the limit display image 300 as illustrated in FIG. 12B. As illustrated in FIG. 12B, the non-imagable region 322 is also displayed in the live view window 121A.

Further, in a case where a rotation instruction to return to the angle within the rotation limit is input in a state in which the live view image 330 has moved beyond the boundary 323 between the imagable region 310 and the non-imagable region 320 as illustrated in FIG. 12(B), the display control unit 236 moves the live view image 330 in the limit display image 300 to the imagable region 310, as illustrated in FIG. 12(A) while the actual angle of the imaging unit 20 of the pan and tilt camera 10 is maintained within the rotation limit.

Thus, in the first variation, in a case where the rotation instruction is an instruction for rotation to an angle exceeding the rotation limit of the imaging unit 20 of the pan and tilt camera 10, the actual angle of the imaging unit 20 of the pan and tilt camera 10 is set within the rotation limit and the live view image 330 moves beyond the boundary between the imagable region and the non-imagable region according to the rotation instruction. Accordingly, the user can recognize that the angle exceeds the rotation limit at a first glance by viewing the limit display image, and can recognize that the smartphone 100 reacts by viewing the live view image moving according to the rotation instruction. Further, it can be said that an operation is easy since the rotation instruction input and the movement of the live view image 330 always match.

In a second variation, in a case where the rotation instruction is an instruction for rotation to an angle exceeding the rotation limit of the imaging unit 20 of the pan and tilt camera 10 or to an angle reaching the rotation limit, the rotation instruction output unit 206 sets the angle of the imaging unit 20 of the pan and tilt camera 10 within the rotation limit, and the display control unit 236 performs a display (hereinafter referred to as "swinging display") for swinging the live view image 330 at the boundary between the imagable region 310 and the non-imagable region 320 of the limit display image 300.

Thus, in the second variation, in a case where the rotation instruction is an instruction for rotation to an angle exceeding the rotation limit of the imaging unit 20 of the pan and tilt camera 10 or an instruction for rotation to an angle reaching the rotation limit, the actual angle of the imaging unit 20 of the pan and tilt camera 10 is set within the rotation limit, and the live view image 330 is swung at the boundary between the imagable region 310 and the non-imagable region 320 of the limit display image 300 and displayed. Therefore, the user can recognize that the smartphone 100 reacts to the rotation instruction, and the user can easily recognize that the rotation instruction is an instruction for rotation to an angle exceeding the rotation limit or an instruction for rotation to an angle reaching the rotation limit.

In the swing display, after the live view image is swung a plurality of times or once, the live view image 330 is set at a position corresponding to the actual pan angle and the actual tilt angle of the imaging unit 20 of the pan and tilt camera 10. That is, the live view image 330 is arranged in the imagable region 310 after being swung. The number of times and a width of swinging are not particularly limited. An operation of gradually reducing the width of the swing may be performed.

(Display Control for Displaying Imagable Region in the Case of Rotation in Opposite Direction)

Imaging may not be possible when the imaging unit 20 of the pan and tilt camera 10 rotates toward a rotation limit close to a current angle among a clockwise rotation limit and a counterclockwise rotation limit, but imaging may be possible when the imaging unit 20 of the pan and tilt camera 10 rotates toward a rotation limit far from the current angle.

For example, when the rotation limit of the clockwise rotation CW of the pan is 150° and the angle of view is ±30° as illustrated in FIG. 5A, a range of the angle exceeding 180° is the non-imagable region 320 in the rotation limit (150°) of clockwise pan as illustrated in FIG. 7. However, for example, when the rotation limit of the counterclockwise rotation CCW of the pan is −150° as illustrated in FIG. 5A, a range of the angle equal to or greater than 180° (which is a range of an angle exceeding 180° in the case of clockwise CW) is the non-imagable region 310 in the rotation limit (−150°) of counterclockwise pan as illustrated in FIG. 8. That is, in the pan and tilt camera 10 having the rotation limit illustrated in FIG. 5A, the imagable region 310 in the pan in the counterclockwise CCW is present within the non-imagable region 320 in the pan in the clockwise CW, and the imagable region 310 in the pan in the clockwise CW is present within the non-imagable region 320 in the pan in the counterclockwise CW.

Figure 13:
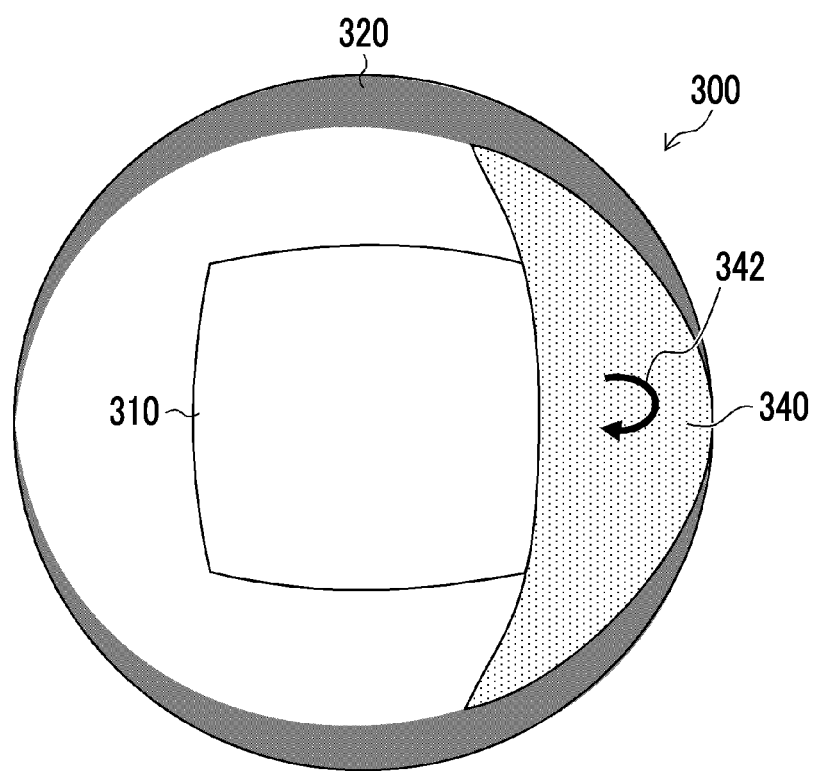
FIG. 13 is an illustrative diagram of display control for displaying an imagable region in the case of rotation in an opposite direction.

FIG. 13 is a diagram illustrating a variation in which a state in which a region 340 (hereinafter referred to as "imagable region at the time of inversion") in which imaging is impossible when the camera is rotated toward the rotation limit close to a current angle among the clockwise rotation limit and the counterclockwise rotation limit, and imaging is possible when the camera is rotated toward the rotation limit far from the current angle is displayed in the limit display image 300. In FIG. 13, an icon (inverted mark 342) indicating that imaging is possible if the rotation instruction is a rotation instruction in an opposite direction is displayed together in the imagable region at the time of inversion 340. The above display control is performed by the display control unit 236 of the smartphone 100.

(Display Control for Displaying Previously Captured Still Image in Imagable Region)

Figure 14A:
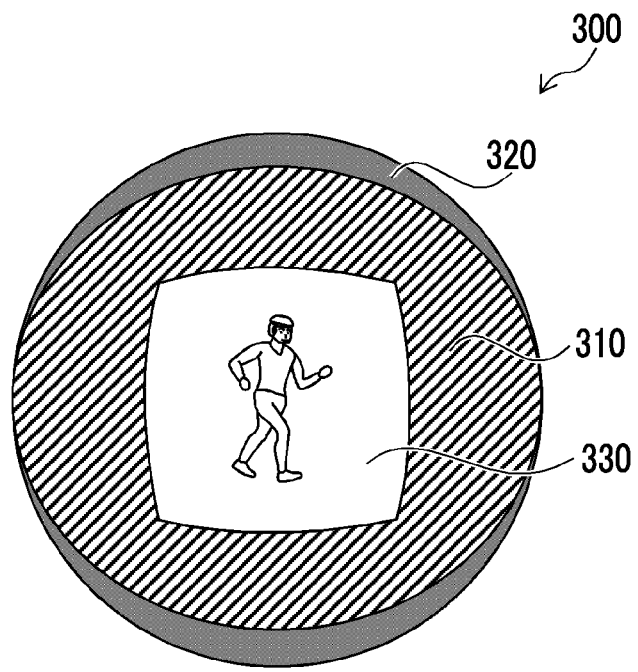
FIGS. 14A and 14B are illustrative diagrams of display control for displaying a previously captured still image in an imagable region.
Figure 14B:
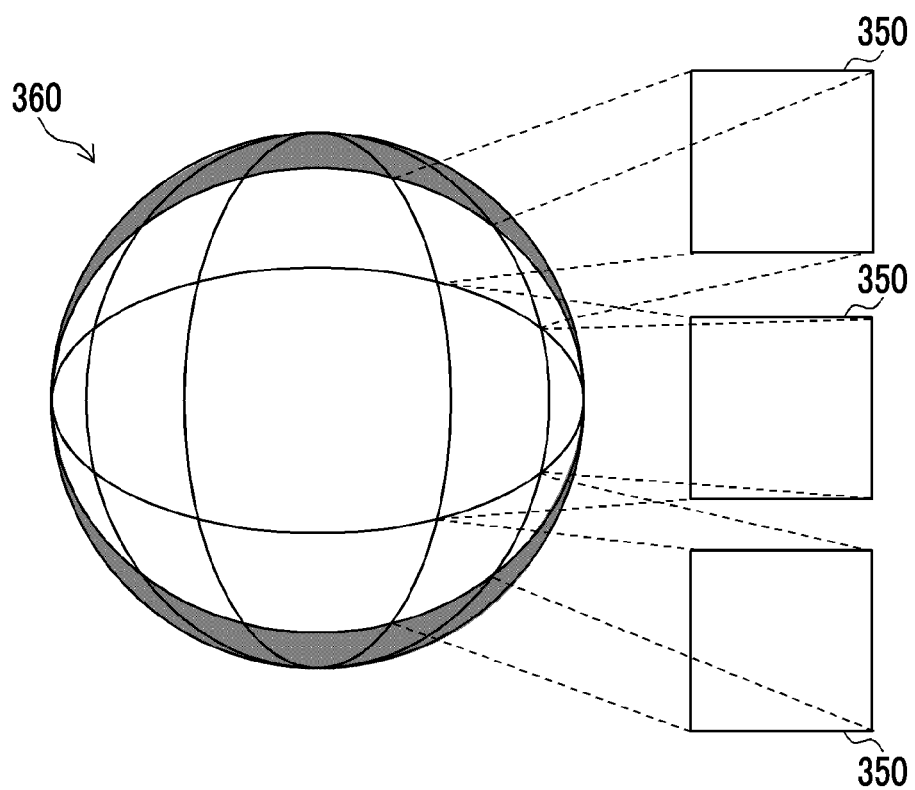
Figure 16:
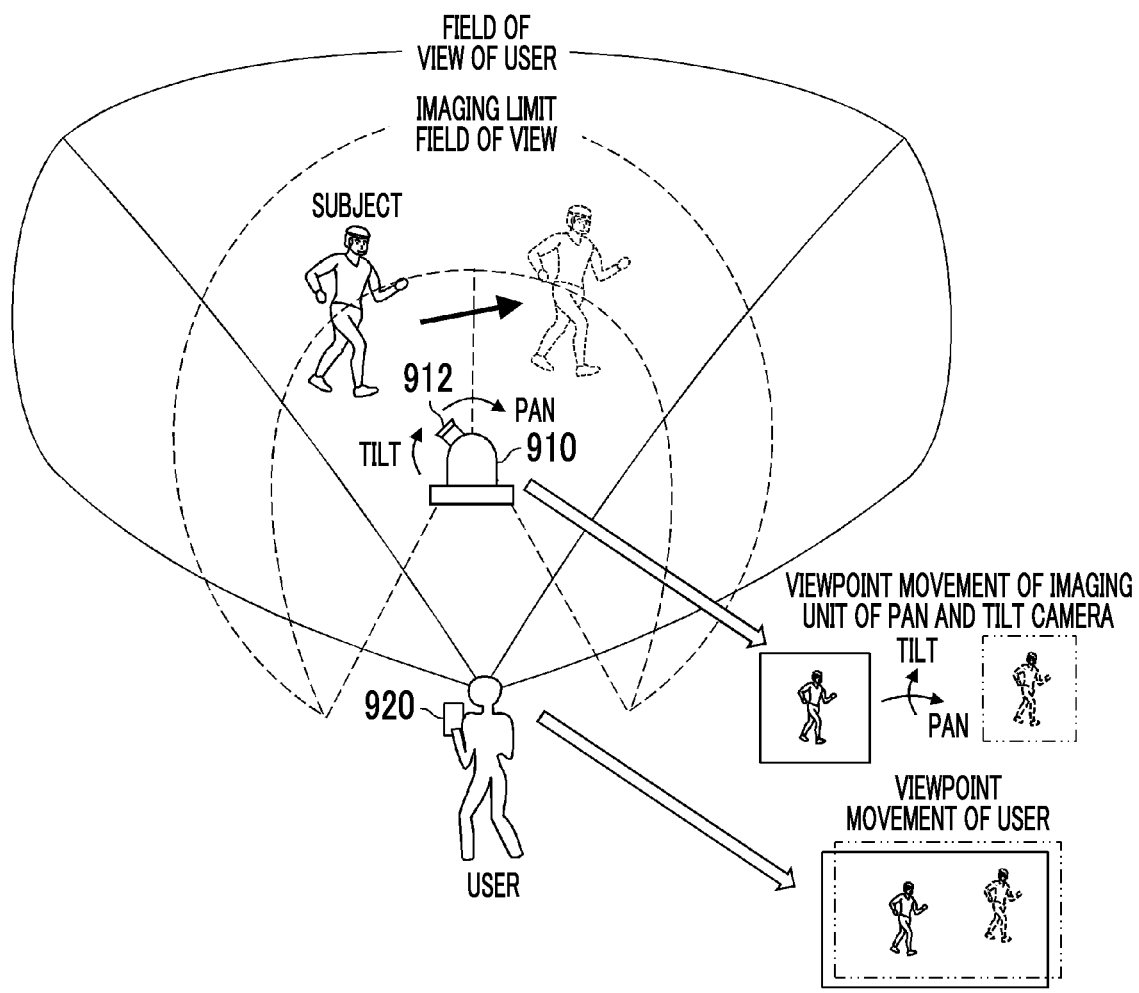
FIG. 16 is a first illustrative diagram that is used for description of a problem of the present invention.
Figure 17:
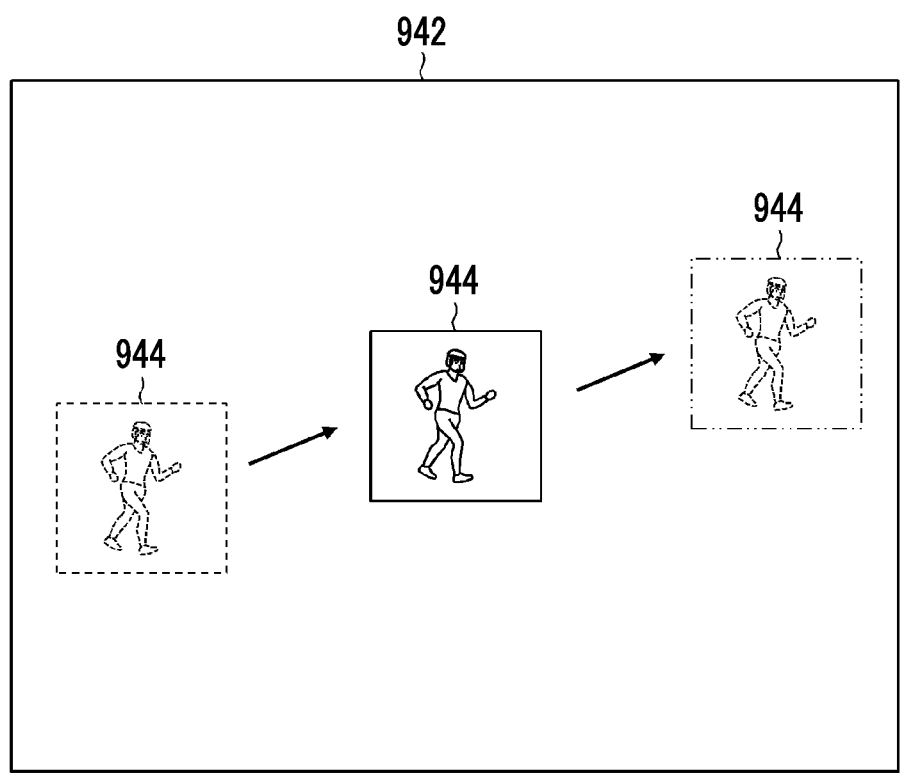
FIG. 17 is a second illustrative diagram that is used for description of a problem of the present invention.

FIGS. 14A and 14B are illustrative diagrams that are used for description of a variation in which a still image captured in advance is displayed in the imagable region 310.

As illustrated in FIG. 14A, the display control unit 236 causes the imaging unit 20 of the pan and tilt camera 10 to display a previously captured still image at a rotatable angle in the pan direction and the tilt direction in the imagable region 310 corresponding to within the rotation limit in the limit display image 300.

The still image is captured by driving the pan and tilt driving unit 33 of the pan and tilt camera 10 via the wireless communication unit 110 of the smartphone 100 under the control of the execution control unit 238 of the smartphone 100. For example, the pan and tilt camera 10 having the rotation limit illustrated in FIGS. 5A and 5B performs capturing of a plurality of still images (350 in FIG. 14B) while performing rotation from −150° to 150° in the pan direction and rotation from 0° to 60° in the tilt direction. Then, as illustrated in FIG. 14B, the display control unit 236 of the smartphone 100 pastes a plurality of still images 350 on an inner surface of a virtual three-dimensional spherical surface 360 to generate a still image captured at the physically rotatable entire circumference in the pan direction and the tilt direction (hereinafter referred to as a "still image of entire circumference imaging"). When the limit display image 300 is displayed in the smartphone as illustrated in FIG. 14A, a necessary portion from the three-dimensional spherical surface 360 is projected onto a plane so as to extract a still image of the imagable region 310 of the limit display image 300 of the two-dimensionally displayed spherical surface.

Although the case in which the still image of entire circumference imaging is generated has been described by way of example in FIG. 14B, the present invention includes a case where entire circumference imaging is not performed. For example, in a case where the rotation range of the imaging unit 20 is forcibly limited to be narrower than an actual physical rotatable range, or in a case where an angle range of the imaging of the subject is limited, capturing of the still image may not performed over an entire rotatable circumference of the imaging unit 20.

(Relationship Between Zoom Instruction and Limit Display Image)

In the above description, display control in a case where a zoom instruction input is not performed in order to facilitate understanding of the present invention has been described. In a case where the imaging unit 20 of the pan and tilt camera 10 has an optical zoom function and in a case where the camera control unit 40 of the pan and tilt camera 10 or the main control unit 101 of the smartphone 100 has an electronic zoom function, the display control unit 236 of the smartphone 100 displays the live view image 330 in the limit display image 300 with a size corresponding to the zoom instruction. Further, the display control unit 236 of the smartphone 100 displays the imagable region 310 and the non-imagable region 320 in the limit display image 300 in a shape corresponding to the zoom instruction. For example, a zoom instruction is received from the user by a tele key 122T and a wide key 122W in FIG. 10.

FIG. 15A illustrates an example of a case where the live view image 330 captured at a tele end (telephoto end) is displayed in the limit display image 300. FIG. 15B illustrates an example of a case where the live view image 330 captured with a reference angle of view is displayed in the limit display image 300. FIG. 15C illustrates an example of a case where the live view image 330 captured at a wide end (wide angle end) is displayed in the limit display image 300. FIG. 15D illustrates a state in which a previously captured still image 370 is displayed around the live view image 330 in a case where a user inputs an instruction of a zoom exceeding a wide limit. This still image 370 is an image obtained by extracting a portion corresponding to the periphery of the live view image 330 from the previously captured still image.

[Variation of System Configuration]

While the aspect in which the "display control unit" which is a main unit of the present invention is arranged in the smartphone 100 has been described in detail, the main unit may be arranged in another device (for example, a computer device generally called a "server") other than the pan and tilt camera 10 and the smartphone 100. In this case, the imaging control device of the present invention is configured with the server alone or to include the server. The present invention includes such a configuration.

Further, the main unit may be arranged in the pan and tilt camera 10. In this case, the imaging control device of the present invention is configured with the main unit arranged in the pan and tilt camera 10 or to include the main unit arranged in the pan and tilt camera 10. The present invention includes such a configuration.

The "rotation instruction input unit" in the present invention is not limited to the case where the input of the rotation instruction of the user is directly received, and a case where an input of an rotation instruction of a user is indirectly received via at least one of wireless communication and wired communication is included. In such a case, the imaging control device of the present invention can be configured with the server alone.

Further, the main units can be distributed and arranged in a plurality of devices. In this case, the imaging control device of the present invention is configured with a plurality of devices.

Further, in the present invention, the imaging control device is not limited to the smartphone and can be configured with other user terminals such as a tablet terminal or a personal computer.

The present invention is not particularly limited to the examples described in this specification and the accompanying drawings, and may be performed in an aspect different from the examples described in this specification and the accompanying drawings without departing from the gist of the present invention.

EXPLANATION OF REFERENCES

10: pan and tilt camera
20: imaging unit
22: imaging lens
24: imaging element
32: pan and tilt mechanism
33: pan and tilt driving unit
100: smartphone (imaging control device)
202: image input unit
204: pan and tilt angle input unit
206: rotation instruction output unit
208: zoom instruction input unit
212: rotation instruction input unit
222: limit display image information storage unit
232: rotation limit determination unit
234: information selection unit
236: display control unit
238: execution control unit

What is claimed is:

1. An imaging control device that controls a camera including an imaging sensor including an imaging lens and an imaging element, a pan and tilt mechanism capable of rotating the imaging sensor in a pan direction and a tilt direction, and a driving unit including a motor that drives the pan and tilt mechanism, the imaging control device comprising:
 a microprocessor configured to:
  receive an input of an instruction of rotation in at least one of a pan direction and a tilt direction of the pan and tilt mechanism of the camera;
  output the rotation instruction to the camera;

receive a live view image captured in a state in which the pan and tilt mechanism of the camera is driven according to the rotation instruction, from the camera; and cause the display unit to perform a display for superimposing the live view image input from the camera on a limit display image of a two-dimensionally displayed spherical surface indicating an imageable region and a non-imageable region respectively corresponding to within a rotation limit and out of the rotation limit of the imaging sensor of the camera, and display the imageable region, the non-imageable region, and the live view image relative to the non-imageable region while rotating the limit display image along the two-dimensionally displayed spherical surface according to the input of the rotation instruction.

2. The imaging control device according to claim 1, wherein in a case where the rotation instruction is an instruction for rotation to an angle exceeding a rotation limit of the imaging sensor of the camera, the rotation instruction output unit sets an angle of the imaging sensor of the camera within a rotation limit, and the microprocessor is further configured to move the live view image beyond a boundary between the imageable region and the non-imageable region in the limit display image.

3. The imaging control device according to claim 1, wherein in a case where the rotation instruction is an instruction for rotation to an angle exceeding a rotation limit of the imaging sensor of the camera or an angle reaching the rotation limit, the rotation instruction output unit sets an angle of the imaging sensor of the camera within a rotation limit, and the microprocessor is further configured to perform a display for swinging the live view image at a boundary between the imageable region and the non-imageable region of the limit display image.

4. The imaging control device according to claim 1, wherein the microprocessor is further configured to cause a region in which imaging is not possible when the imaging sensor of the camera is rotated toward a rotation limit close to a current angle among a clockwise rotation limit and a counterclockwise rotation limit, but imaging is possible when the imaging sensor is rotated toward a rotation limit far from the current angle to be displayed within the limit display image.

5. The imaging control device according to claim 1, wherein the microprocessor is further configured to cause a still image captured in advance at a rotatable angle in the pan direction and the tilt direction by the imaging sensor of the camera to be displayed in the imageable region corresponding to within the rotation limit in the limit display image.

6. The imaging control device according to claim 5, wherein the microprocessor is further configured to cause a still image captured in an entire rotatable circumference in the pan direction and the tilt direction by the imaging sensor of the camera to be displayed in the imageable region.

7. The imaging control device according to claim 1, wherein the microprocessor is further configured to:
receive an input of an optical or electronic zoom instruction of the live view image in the camera; and
output the zoom instruction to the camera, wherein the microprocessor is further configured to receive the live view image zoomed by the camera according to the zoom instruction, from the camera, and
the microprocessor is further configured to cause the display unit to display the live view image with a size corresponding to the zoom instruction.

8. The imaging control device according to claim 1, wherein the microprocessor is further configured to cause the display unit to display the live view image separately from the live view image superimposed on the limit display image.

9. A camera system comprising the imaging control device according to claim 1, and the camera.

10. An imaging control method of controlling a camera including an imaging sensor including an imaging lens and an imaging element, a pan and tilt mechanism capable of rotating the imaging sensor in a pan direction and a tilt direction, and a driving unit including a motor that drives the pan and tilt mechanism, the imaging control method comprising the steps of:
receiving an input of an instruction of rotation in at least one of a pan direction and a tilt direction of the pan and tilt mechanism of the camera;
outputting the rotation instruction to the camera;
receiving a live view image captured in a state in which the pan and tilt mechanism of the camera is driven according to the rotation instruction, from the camera; and
superimposing the live view image input from the camera on a limit display image of a two-dimensionally displayed spherical surface indicating an imageable region and a non-imageable region respectively corresponding to within a rotation limit and out of the rotation limit of the imaging sensor of the camera, and displaying the imageable region, the non-imageable region, and the live view image relative to the non-imageable region while rotating the limit display image along the two-dimensionally displayed spherical surface according to the input of the rotation instruction.

11. A non-transitory computer-readable recording medium having a program for controlling a camera including an imaging sensor including an imaging lens and an imaging element, a pan and tilt mechanism capable of rotating the imaging sensor in a pan direction and a tilt direction, and a driving unit including a motor that drives the pan and tilt mechanism, the program causing a computer to execute the steps of:
receiving an input of an instruction of rotation in at least one of a pan direction and a tilt direction of the pan and tilt mechanism of the camera;
outputting the rotation instruction to the camera;
receiving a live view image captured in a state in which the pan and tilt mechanism of the camera is driven according to the rotation instruction, from the camera; and
superimposing the live view image input from the camera on a limit display image of a two-dimensionally displayed spherical surface indicating an imageable region and a non-imageable region respectively corresponding to within a rotation limit and out of the rotation limit of the imaging sensor of the camera, and displaying the imageable region, the non-imageable region, and the live view image relative to the non-imageable region while rotating the limit display image along the two-dimensionally displayed spherical surface according to the input of the rotation instruction.

* * * * *